United States Patent [19]

Kato et al.

[11] Patent Number: 5,176,975
[45] Date of Patent: Jan. 5, 1993

[54] ELECTROPHOTOGRAPHIC LITHOGRAPHIC PRINTING PLATE PRECURSOR

[75] Inventors: Eiichi Kato; Kazuo Ishii, both of Shizuoka, Japan

[73] Assignee: Fuji Photo Film Co., Ltd., Kanagawa, Japan

[21] Appl. No.: 727,166

[22] Filed: Jul. 9, 1991

[30] Foreign Application Priority Data

Jul. 9, 1990 [JP] Japan ................... 2-179533

[51] Int. Cl.$^5$ ............................................. G03G 5/087
[52] U.S. Cl. .......................................... 430/49; 430/96
[58] Field of Search ............................... 430/49, 96

[56] References Cited

U.S. PATENT DOCUMENTS 4,275,133  6/1981  Chu et al. ................... 430/31
4,960,661 10/1990  Kato et al. .................. 430/49
4,996,121  2/1991  Kato et al. .................. 430/87

FOREIGN PATENT DOCUMENTS 63-223649  9/1988  Japan .
2-151868   6/1990  Japan .

Primary Examiner—Marion E. McCamish
Assistant Examiner—Rosemary Ashton
Attorney, Agent, or Firm—Sughrue, Mion, Zinn, Macpeak & Seas

[57] ABSTRACT

An electrophotographic lithographic printing plate precursor which utilizes an electrophotographic light-sensitive material comprising a conductive support having provided thereon at least one photoconductive layer containing photoconductive zinc oxide and a binder resin, wherein the binder resin contains at least one graft-type copolymer comprising, as a polymerizable component, at least one monofunctional macromonomer which has a weight average molecular weight of from $1 \times 10^3$ to $2 \times 10^4$, comprises at least one polymerizable component containing a functional group which has at least one atom selected from a fluorine atom and a silicon atom and is capable of forming at least one hydrophilic group selected from a sulfo group, a phosphono group, a carboxy group and a hydroxy group through decomposition, and has a polymerizable double bond group.

7 Claims, No Drawings

ELECTROPHOTOGRAPHIC LITHOGRAPHIC PRINTING PLATE PRECURSOR

FIELD OF THE INVENTION

The present invention relates to an electrophotographic lithographic printing plate precursor for producing a printing plate through electrophotography and, more particularly, to an improvement in a binder resin constituting a photoconductive layer of the lithographic printing plate precursor.

BACKGROUND OF THE INVENTION

Various kinds of offset printing plate precursors for directly producing printing plates have hitherto been proposed, and some of which have already been put into practical use. The most widely employed precursor is a light-sensitive material having a photoconductive layer comprising photoconductive particles, such as zinc oxide, and a binder resin provided on a conductive support. A highly lipophilic toner image is subsequently formed on the photoconductive layer surface by an ordinary electrophotographic process. The surface of the photoconductive layer having the toner image is then treated with an oil-desensitizing solution, called an etching solution, to selectively render the non-image areas hydrophilic thereby producing an offset printing plate.

In order to obtain satisfactory prints, an offset printing plate precursor or light-sensitive material must faithfully reproduce an original on the surface thereof; the surface of the light-sensitive material should have a high affinity for an oil-desensitizing solution so as to render non-image areas sufficiently hydrophilic and, at the same time, should be water resistant. When used as printing plate, the photoconductive layer having a toner image formed thereon should not come off during printing, and should be well receptive to dampening water so that the non-image areas can remain sufficiently hydrophilic to be free from stains, even after a large number of prints have been reproduced from the plate.

These properties are affected by the proportion of zinc oxide to binder resin in the photoconductive layer as already known. Specifically, when the proportion of zinc oxide particles to binder resin in the photoconductive layer is decreased, the oil-desensitivity of the photoconductive layer surface is enhanced and background stains are decreased. However, the internal cohesive force and mechanical strength of the photoconductive layer itself is lowered resulting in the deterioration of the printing durability. On the contrary, when the proportion of a resin binder is increased, the background stains are increased although the printing durability is heightened. Background stains are related to the oil-desensitivity of the photoconductive layer surface. Not only does the ratio of zinc oxide to binder resin in the photoconductive layer influence the oil desensitivity, but it has become apparent that the oil-desensitivity also depends greatly on the kind of the binder resin employed.

Known resins for use in photoconductive layers include silicone resins as disclosed in JP-B-34-6670 (the term "JP-B" as used herein means an "examined Japanese patent publication"), styrene-butadiene resins as disclosed in JP-B-35-1950, alkyd resins, maleic acid resins and polyamides as disclosed in JP-B-35-11219, vinyl acetate resins as disclosed in JP-B-41-2425, vinyl acetate copolymers as disclosed in JP-B-41-2426, acryl resins as disclosed in JP-B-35-11216, acrylic acid ester copolymers as disclosed, for example, in JP-B-35-11219, JP-B-36-8510, and JP-B-41-13946. However, electrophotographic light-sensitive materials employing these resins have various problems including (1) low chargeability of the photoconductive layer, (2) poor image reproducibility (in particular, dot reproducibility and resolving power), (3) low photosensitivity, (4) insufficient oil-desensitivity of the photoconductive layer surface resulting in generation of background stains on the prints when offset printing is performed, even when subjected to an oil-desensitizing treatment for producing an offset master, (5) insufficient film strength of the photoconductive layer, resulting in peeling off of the photoconductive layer during offset printing, and a large number of prints can not be obtained, and (6) the image quality is apt to be influenced by the environmental condition at the time of image reproduction (e.g., high temperature and high humidity condition).

With respect to the offset master, the background stain resulting from insufficiency in oil-desensitization is a particularly serious problem. For the purpose of solving this problem, as binder resins for zinc oxide, various binder resins have been developed for improving the oil-desensitivity. Resins having an effect on improvement in oil-desensitivity of the photoconductive layer include those as follows: JP-B-50-31011 discloses the combination of a resin having a weight average molecular weight of from $1.8 \times 10^4$ to $1.0 \times 10^5$ and a glass transition point (Tg) of from 10° C. to 80° C., and which is prepared by copolymerizing a (meth)acrylate monomer and another monomer in the presence of fumaric acid, with a copolymer prepared from a (meth)acrylate monomer and a monomer other than fumaric acid; JP-A-53-54027 (the term "JP-A" as used herein means an "unexamined published Japanese patent application") discloses a terpolymer comprising a (meth)acrylic acid ester unit having a substituent which contains a carboxylic acid group apart from the ester linkage by at least 7 atoms; JP-A-54-20735 and JP-A-57-202544 disclose a tetra- or penta-polymer comprising an acrylic acid unit and a hydroxyethyl (meth)acrylate unit; and JP-A-58-68046 discloses a tercopolymer comprising a (meth)acrylic acid ester unit having an alkyl group containing from 6 to 12 carbon atoms as a substituent and a vinyl monomer containing a carboxylic acid group. However, even with the practical use of the above described resins, which are described to enhance oil-desensitivity, the resulting offset masters are still insufficient in resistance to background stains and printing durability.

On the other hand, resins of the type which contain functional groups capable of producing hydrophilic groups through decomposition have been investigated on an aptitude for the resin binder. For example, the resins containing functional groups capable of producing hydroxy groups by decomposition are disclosed in JP-A-62-195684, JP-A-62-210475 and JP-A-62-210476, those containing functional groups capable of producing carboxy groups through decomposition are disclosed in JP-A-62-212669, JP-A-1-63977 and JP A-62-286064, and the containing functional groups capable of producing hydroxy groups or carboxy groups through decomposition and having crosslinking structure therebetween which restrains the solubility thereof in water and impart water swellability thereto, whereby the prevention of background stains and the printing durability are furthermore improved as disclosed in JP-A-1-

191157, JP-A-1-197765, JP-A-1-191860, JP-A-1-185667, JP-A 1-179052 and JP-A-1-191158.

However, when these resins are practically employed as the binder resin of lithographic printing plate precursor in an amount sufficient to increase the hydrophilic property of the non-image areas and to prevent background stains, the electrophotographic characteristics (particularly, dark charge retention property and photosensitivity) are fluctuated and good duplicated images can not be stably obtained sometimes in a case wherein the environmental conditions at the image formation are changed to high temperature and high humidity or to low temperature and low humidity. As a result, the printing plate precursor provides prints of poor image or having background stains.

Further, when a scanning exposure system using a semiconductor laser beam is applied to digital direct type electrophotographic lithographic printing plate precursor, the exposure time becomes longer and also there is a restriction on the exposure intensity as compared to a conventional overall simultaneous exposure system using a visible light, and hence a higher performance has been required for the electrostatic characteristics, in particular, the dark charge retention property and photosensitivity.

However, when the above-described lithographic printing plate precursors containing known resins are employed in the scanning exposure system described above, the electrophotographic characteristics degrade, and the occurrence of background fog, cutting of fine lines and spread of letters are observed in the duplicated image obtained. As a result, when they are employed as printing plates, the image quality of prints obtained becomes poor, and the effect of preventing background stains owing to the increase in hydrophilic property in the non-image areas due to the binder resin is lost.

SUMMARY OF THE INVENTION

Therefore, an object of the present invention is to provide an electrophotographic lithographic printing plate precursor having excellent electrostatic characteristics (particularly, dark charge retention property and photosensitivity), capable of reproducing a faithful duplicated image to the original, forming neither overall background stains nor dotted background stains on prints, and showing excellent printing durability.

Another object of the present invention is to provide an electrophotographic lithographic printing plate precursor effective for a scanning exposure system using a semiconductor laser beam.

Other objects of the present invention will become apparent from the following description and examples.

It has been found that the above described objects of the present invention can be accomplished by an electrophotographic lithographic printing plate precursor which utilizes an electrophotographic light-sensitive material comprising a conductive support having provided thereon at least one photoconductive layer containing photoconductive zinc oxide and a binder resin, wherein the binder resin contains at least one graft-type copolymer formed from, as a polymerizable component, at least one monofunctional macromonomer which has a weight average molecular weight of from $1 \times 10^3$ to $2 \times 10^4$, comprises at least one polymer component containing a functional group which has at least one atom selected from a fluorine atom and a silicon atom and is capable of forming at least one hydrophilic group selected from a sulfo group, a phosphono group, a carboxy group and a hydroxy group through decomposition, and has a polymerizable double bond group represented by the general formula (I) described below bonded to only one terminal of the main chain thereof.

wherein $X_1$ represents —COO—, —OCO—, $\text{-(CH}_2\text{)}_n\text{OCO-}$, $\text{-(CH}_2\text{)}_m\text{COO-}$, —O—, —SO$_2$—, —CO—, —CONHCOO—, —CONHCONH—,

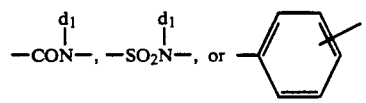

(wherein $d_1$ represents a hydrogen atom or a hydrocarbon group; and n and m each represents an integer of from 1 to 4); and $a_1$ and $a_2$, which may be the same or different, each represents a hydrogen atom, a halogen atom, a cyano group, a hydrocarbon group, —COO—$Z_1$ or —COO—$Z_1$ bonded via a hydrocarbon group (wherein $Z_1$ represents a hydrocarbon group which may be substituted).

DETAILED DESCRIPTION OF THE INVENTION

The present invention is characterized in that the binder resin of the photoconductive layer of the lithographic printing plate precursor comprises the graft-type copolymer comprising at least (1) the monofunctional macromonomer (hereinafter sometimes referred to as macromonomer (M)) containing at least one functional group which has at least one fluorine atom or silicon atom and is capable of forming at least one hydrophilic group including a sulfo group, a phosphono group, a carboxy group and a hydroxy group through decomposition and (2) a monofunctional monomer. The lithographic printing plate precursor according to the present invention has superior characteristics in that it reproduces duplicated images faithful to the original, in that it does not generate background stains owing to a good hydrophilic property of the non-image areas, in that it has excellent smoothness of the photoconductive layer and excellent electrostatic characteristics, and in that it has good printing durability.

Moreover, the lithographic printing plate precursor of the present invention is not influenced by environmental conditions during the plate-making process, and is excellent in preservability before the plate-making process.

In a lithographic printing plate, it is important to render the surface portions of the non-image areas thereof sufficiently hydrophilic. The above described known resin which forms a hydrophilic group through decomposition is uniformly dispersed throughout in the photoconductive layer. Therefore, a large amount of the hydrophilic group-forming functional groups are present throughout the photoconductive layer in order to obtain the sufficiently hydrophilic surface thereof. As a result, it is believed that the adequate interaction between photoconductive zinc oxide and the binder resin can not be sufficiently maintained, and the electrophotographic characteristics degrade when the environmental conditions are changed or in a case of conducting a scanning exposure system.

On the contrary, the binder resin according to the present invention is characterized by using the graft-type copolymer formed from a polymerizable component corresponding to the monofunctional macromonomer composed of a polymer component containing a functional group capable of forming a hydrophilic group through decomposition which is protected by a protective group containing a fluorine atom and/or a silicon atom (hereinafter sometimes referred to as Segment A) and a polymerizable component corresponding to the monofunctional monomer copolymerizable with the monofunctional macromonomer (hereinafter sometimes referred to as Segment B). The resin according to the present invention exhibits the specific behavior in the photoconductive layer different from conventionally known random copolymers. More specifically, when the resin according to the present invention is employed as a binder resin, it is believed that the adequate interaction between Segment B and photoconductive zinc oxide occurs to maintain the excellent electrophotographic characteristics, and on the other hand, a micro-phase-separation structure due to the difference in compatibility between Segment A and Segment B is formed. Moreover, since Segments A which form hydrophilic groups upon decomposition are more apt to to be present in the surface portion of the photoconductive layer, the effect for rendering the non-image areas hydrophilic is accelerated, which results in the prevention of background stains on the prints.

Furthermore, when the resin according to the present invention in the photoconductive layer is subjected to the oil-desensitizing treatment to form hydrophilic groups, Segments A which have been rendered hydrophilic are oriented to the surface, and on the contrary, Segments B which are relatively oleophilic are oriented to the inner portion of the photoconductive layer to interact with other binder resins and/or zinc oxide. Due to such an anchor effect, the resin is prevented from dissolving into the etching solution and/or dampening water used during printing, and as a result the good hydrophilic property of the non-image areas can be properly maintained to provide a large number of prints having good image quality.

Now, the monofunctional macromonomer containing the functional group capable of forming a hydrophilic group which constitutes the graft portion of the graft-type copolymer according to the present invention will be described in detail below.

The functional group containing a fluorine atom and/or a silicon atom and being capable of forming at least one hydrophilic group through decomposition (hereinafter sometimes simply referred to as a hydrophilic group-forming functional group) which is a substituent of a polymer component of the macromonomer (M) is described below.

The hydrophilic group-forming functional group according to the present invention forms a hydrophilic group through decomposition, and one or more hydrophilic groups may be formed from one functional group.

In accordance with a preferred embodiment of the present invention, the graft-type copolymer containing the hydrophilic group-forming functional group is a resin containing at least one kind of functional group represented by the general formula (III), (IV), (V) or (VI) described below.

According to a preferred embodiment of the present invention, the functional group capable of forming —COOH, —SO$_3$H or —PO$_3$H$_2$ is represented by the following general formula (III):

$$-V-O-L_1 \qquad (III)$$

wherein V represents

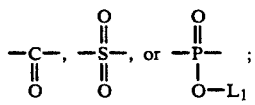

and L$_1$ represents —CF$_3$,

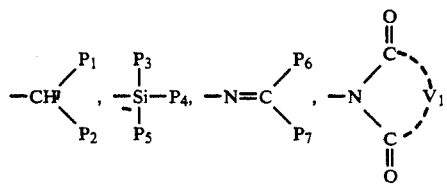

or $+(CH_2)_{n_2}SO_2P_8$.

When L$_1$ represents

P$_1$ represents a hydrogen atom, —CN, —CF$_3$, —COR$_{11}$ or —COOR$_{11}$ (wherein R$_{11}$ represents an alkyl group having from 1 to 6 carbon atoms which may be substituted (e.g., methyl, ethyl, propyl, butyl, pentyl, or hexyl), an aralkyl group having 7 to 12 carbon atoms which may be substituted (e.g., benzyl, phenethyl, chlorobenzyl, methoxybenzyl, chlorophenethyl, or methylphenethyl), an aromatic group (e.g., a phenyl or napthyl group which may be substituted such as phenyl, chlorophenyl, dichlorophenyl, methylphenyl, methoxyphenyl, acetylphenyl, acetamidophenyl, methoxycarbonylphenyl, or naphthyl), $+(CH_2)_{\overline{n_1}}(CF_2)_{\overline{m_1}}CF_2H$ (wherein n$_1$ represents an integer of 1 or 2; and m$_1$ represents an integer of from 1 to 8), $+(CH_2)_{\overline{n_2}}C_{m_2}H_{2m_2+1}$ (wherein n$_2$ represents an integer of from 0 to 2; and m$_2$ represents an integer of from 1 to 8), or

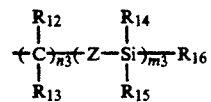

(wherein n$_3$ represents an integer of from 1 to 6; m$_3$ represents an integer of from 1 to 4; Z represents a mere bond or —O—; R$_{12}$ and R$_{13}$, which may be the same or different, each represents a hydrogen atom, an alkyl group having from 1 to 4 carbon atoms (e.g., methyl, ethyl, propyl, or butyl); and R$_{14}$, R$_{15}$ and R$_{16}$, which may be the same or different, each represents a hydrocarbon group having from 1 to 12 carbon atoms which may be substituted or —OR$_{17}$ (wherein R$_{17}$ represents a hydrocarbon group having from 1 to 12 carbon atoms which may be substituted). Specific examples of the hydrocarbon group for $R_{14}$, $R_{15}$, $R_{16}$ or $R_{17}$ include those described for $R_{11}$ above.

$P_2$ represents $-CF_3$, $-COR_{11}$ or $-COOR_{11}$ (wherein $R_{11}$ has the same meaning as defined above).

Further, at least one of $P_1$ and $P_2$ is selected from the fluorine or silicon atom-containing substituents.

When $L_1$ represents

$P_3$, $P_4$, and $P_5$, which may be the same or different, each has the same meaning as $R_{14}$, $R_{15}$ or $R_{16}$.

When $L_1$ represents

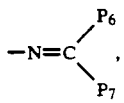

$P_6$ and $P_7$, which may be the same or different, each has the same meaning as $R_{11}$, provided that at least one of $P_6$ and $P_7$ is selected from the fluorine or silicon atom-containing substituents.

When $L_1$ represents $-(CH_2)_{\overline{n1}}SO_2P_8$, $P_8$ represents $-(CH_2)_{\overline{n1}}(CF_2)_{\overline{m1}}CF_2H$, $-(CH_2)_{\overline{n2}}C_{m2}H_{2m2+1}$ or

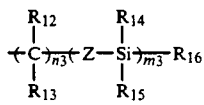

(wherein $n_1$, $m_1$, $n_2$, $m_2$, $n_3$, $m_3$, $R_{12}$, $R_{13}$, $R_{14}$, $R_{15}$ and $R_{16}$ each has the same meaning as defined above).

When $L_1$ represents

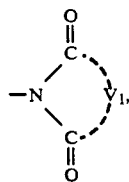

$V_1$ represents an organic moiety necessary to form a cyclic imido group having a substituent containing a fluorine atom and/or a silicon atom. Specific examples of the cyclic imido group include a maleimido group, a glutaconimido group, a succinimido group, and phthalimido group. Specific examples of the substituent containing a fluorine atom and/or a silicon atom include the hydrocarbon groups represented by $P_8$ and $-S-P_9$ (wherein $P_9$ has the same meaning as $P_8$).

According to another preferred embodiment of the present invention, the functional group capable of forming a hydroxy group is represented by the following general formula (IV), (V) or (VI):

$$-O-L_2 \quad (IV)$$

wherein $L_2$ represents

(wherein $P_3$, $P_4$ and $P_5$ each has the same meaning as defined above),

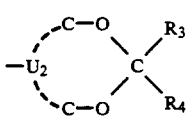

wherein $R_3$ and $R_4$, which may be the same or different, each represents a hydrogen atom, or has the same meaning as $R_{11}$ (provided that at least one of $R_3$ and $R_4$ is selected from the fluorine or silicon atom-containing substituents); and $U_2$ represents a carbon-carbon chain in which a hetero atom may be introduced (provided that the number of atoms present between the two oxygen atoms does not exceed 5),

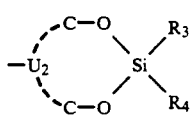

wherein $U_2$, $R_3$ and $R_4$ each has the same meaning as defined above.

Specific examples of the functional groups represented by the general formula (III), (IV), (V) or (VI) described above are set forth below, but the present invention should not be construed as being limited thereto.

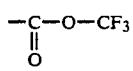            (1)

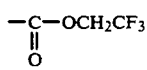           (2)

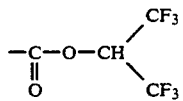           (3)

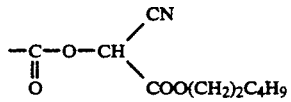           (4)

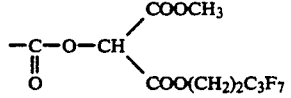           (5)

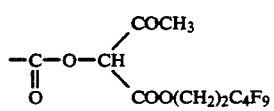           (6)

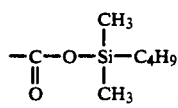           (7)

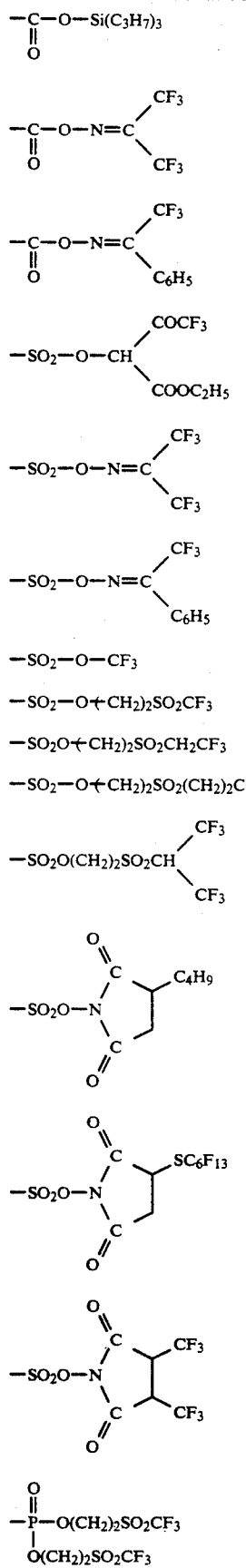
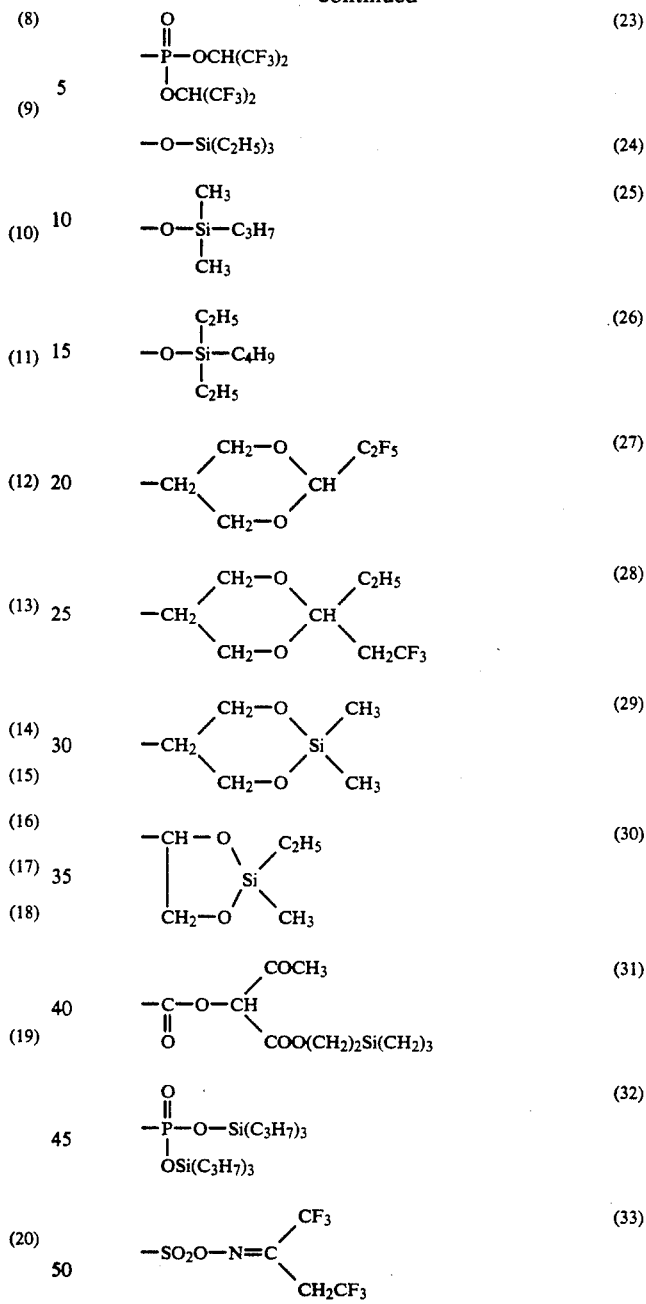
The polymerizable component containing the functional group of the general formula (III), (IV), (V) or (VI) to be used, as described above, in preparing the desired resin by a polymerization reaction includes, for example, a component represented by the following general formula (VII).
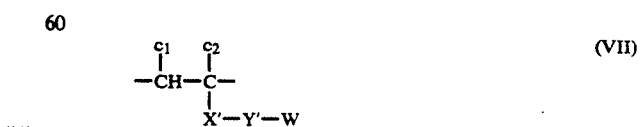
wherein X′ represents —O—, —CO—, —COO—, —OCO—,

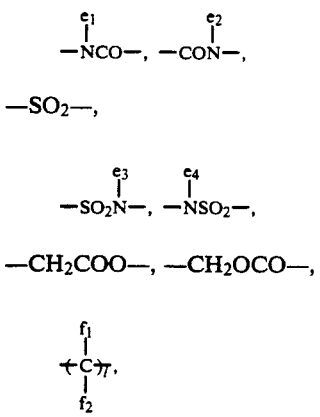

an aryl group, or a heterocyclic group (wherein $e_1$, $e_2$, $e_3$ and $e_4$ each represents a hydrogen atom, a hydrocarbon group, or —Y'—W; $f_1$ and $f_2$, which may be the same or different, each represents a hydrogen atom, a hydrocarbon group, or —Y'—W; and l is an integer of from 0 to 18); Y' represents carbon-carbon bond(s) for connecting the linkage group X' to the functional group W, between which one or more hetero atoms (e.g., oxygen, sulfur, nitrogen) may be present, specific examples including

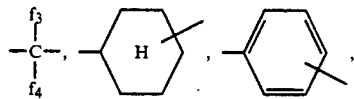

$\text{-(CH=CH)-}$, —O—, —S—,

—CO—, —CONH—, —SO$_2$—, —SO$_2$NH—, —NHCOO—, —NHCONH— (wherein $f_3$, $f_4$ and $f_5$ each has the same meaning as $f_1$ or $f_2$ described above), and a combination thereof; W represents a functional group such as one represented by the general formula (III), (IV), (V) or (VI); and $c_1$ and $c_2$, which may be the same or different, each represents a hydrogen atom, a halogen atom (e.g., chlorine or bromine), a cyano group, a hydrocarbon group (e.g., an alkyl group containing from 1 to 12 carbon atoms which may be substituted, such as methyl, ethyl, propyl, butyl, methoxycarbonyl, ethoxycarbonyl, propoxycarbonyl, butoxycarbonyl, hexyloxycarbonyl, methoxycarbonylmethyl, ethoxycarbonylmethyl, or butoxycarbonylmethyl, an aralkyl group such as benzyl, or phenethyl, or an aryl group such as phenyl, tolyl, xylyl, or chlorophenyl ) or —COOZ$_0$ (wherein Z$_0$ represents an alkyl group containing from 1 to 18 carbon atoms, an alkenyl group, an aralkyl group, an alicyclic group or an aryl group, each of which may be substituted with a group containing the functional group W).

Further, in the general formula (VII), the moiety of —X'—Y'— may not be present. In such a case, W is directly bonded to

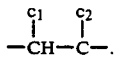

The macromonomer (M) is a macromonomer having a weight average molecular weight of from $1 \times 10^3$ to $2 \times 10^4$, comprising at least one polymerizable component containing the specific hydrophilic group-forming functional group (for example, a component corresponding to a repeating unit represented by the general formula (VII) described above), and having a polymerizable double bond group represented by the general formula (I) bonded to only one terminal of the main chain thereof.

In the above described general formula (I) and the general formulae (IIa) and (IIb) described hereinafter, the hydrocarbon groups represented by or included in $a_1$, $a_2$, $X_1$, $b_1$, $b_2$, $X_2$, $R_1$, and $R_2$ each has the number of carbon atoms as described (as unsubstituted hydrocarbon group) and these hydrocarbon groups may have one or more substituents.

In the general formula (I), $X_1$ represents —COO—, —OCO—, $\text{-(CH}_2\text{)}_{\overline{n}}\text{OCO-}$, $\text{-(CH}_2\text{)}_{\overline{m}}\text{COO-}$, —O—, —SO$_2$—, —CO—, —CONHCOO—, —CONHCONH—,

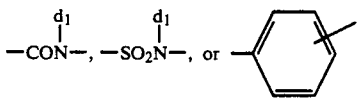

wherein n and m each represents an integer of from 1 to 4; and $d_1$ represents a hydrogen atom or a hydrocarbon group, and preferred examples of the hydrocarbon group include an alkyl group having from 1 to 18 carbon atoms which may be substituted (e.g., methyl, ethyl, propyl, butyl, pentyl, hexyl, heptyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl), an alicyclic group having from 5 to 8 carbon atoms which may be substituted (e.g., cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl)

When $X_1$ represents

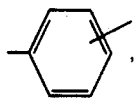

the benzene ring may have a substituent such as, for example, a halogen atom (e.g., chlorine and bromine), an alkyl group (e.g., methyl, ethyl, propyl, butyl, chloromethyl, methoxymethyl) and an alkoxy group (e.g., methoxy, ethoxy, propoxy, and butoxy).

In the general formula (I), $a_1$ and $a_2$, which may be the same or different, each preferably represents a hydrogen atom, a halogen atom (e.g., chlorine and bromide), a cyano group, an alkyl group having from 1 to 4 carbon atoms (e.g., methyl, ethyl, propyl, and butyl), —COO—$Z_1$, or —COO$Z_1$ bonded via a hydrocarbon group (wherein $Z_1$ represents preferably an alkyl group an alkenyl group, an aralkyl group, an alicyclic group or an aryl group, these groups may be substituted, and specific examples thereof are the same as those described above for $d_1$).

In the general formula (I), —COO—$Z_1$ may be bonded via a hydrocarbon group as above, and examples of such hydrocarbon groups include a methylene group, an ethylene group, and a propylene group.

In the general formula (I), $X_1$ is more preferably —COO—, —OCO—, —CH$_2$OCO—, —CH$_2$COO—, —O—, —CONH—, —SO$_2$NH—, or

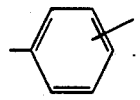

Also, $a_1$ and $a_2$, which may be the same or different, each represents more preferably a hydrogen atom, a methyl group, —COO$Z_1$, or —CH$_2$COO$Z_1$ (wherein $Z_1$ represents more preferably an alkyl group having from 1 to 6 carbon atoms (e.g., methyl, ethyl, propyl, butyl, and hexyl)). Most preferably, one of $a_1$ and $a_2$ represents a hydrogen atom.

That is, specific examples of the polymerizable double bond group represented by the general formula

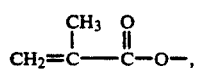

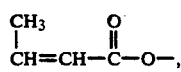

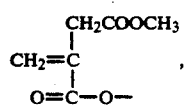

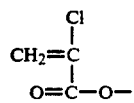

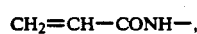

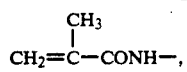

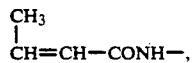

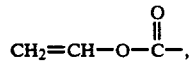

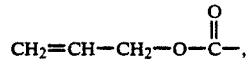

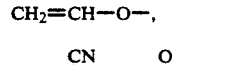

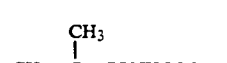

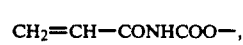

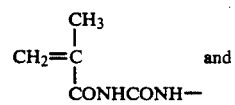

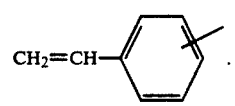

The monofunctional macromonomer (M) used in the present invention has a chemical structure in which the polymerizable double bond group represented by the general formula (I) is bonded to only one terminal of the main chain of the polymer comprising at least a repeating unit containing the specific hydrophilic group-forming functional group either directly or through an appropriate linkage group.

Specific examples of the linkage group include a linkage group represented by

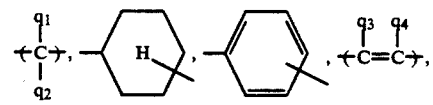

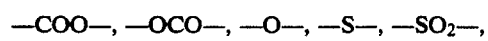

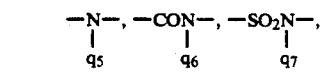

—NHCOO—, —NHCONH—, or

and a linkage group formed by a combination of these linkage groups (in the above formulae, $q_1$ to $q_4$, which may be the same or different, each represents a hydrogen atom, a halogen atom (e.g., preferably, fluorine, chlorine, and bromine), or a hydrocarbon group having from 1 to 7 carbon atoms (e.g., preferably, methyl, ethyl, propyl, butyl, 2-chloroethyl, 2-methoxyethyl, 2-methoxycarbonylethyl, benzyl, methoxybenzyl, phenyl, methoxyphenyl, and methoxycarbonylphenyl) and $q_5$ to $q_7$ each has the same meaning as $d_1$ described above).

Specific examples of the polymerizable double bond-containing group bonded to only one terminal of the main chain of the monofunctional macromonomer comprising a polymer component containing the specific hydrophilic group-forming functional group are set forth below, but the present invention should not be construed as being limited thereto.

In the following formulae, $p_1$ represents —H, —$CH_3$, —$CH_2COOCH_3$, —Cl, —Br, or —CN; $p_2$ presents —H or —$CH_3$; X represents —Cl or —Br; n represents an integer of from 2 to 12; and m represents an integer of from 1 to 4.

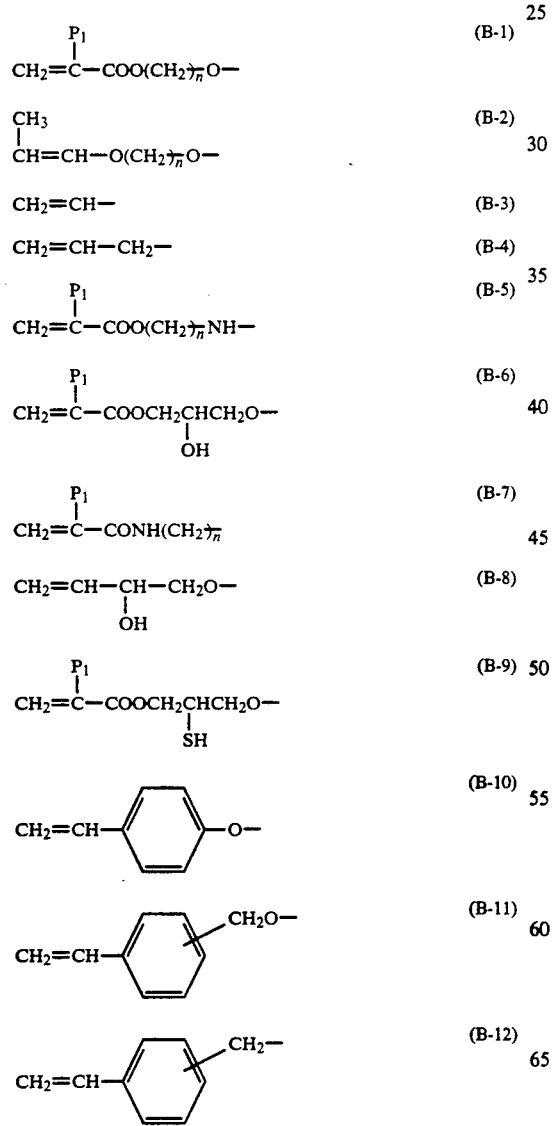

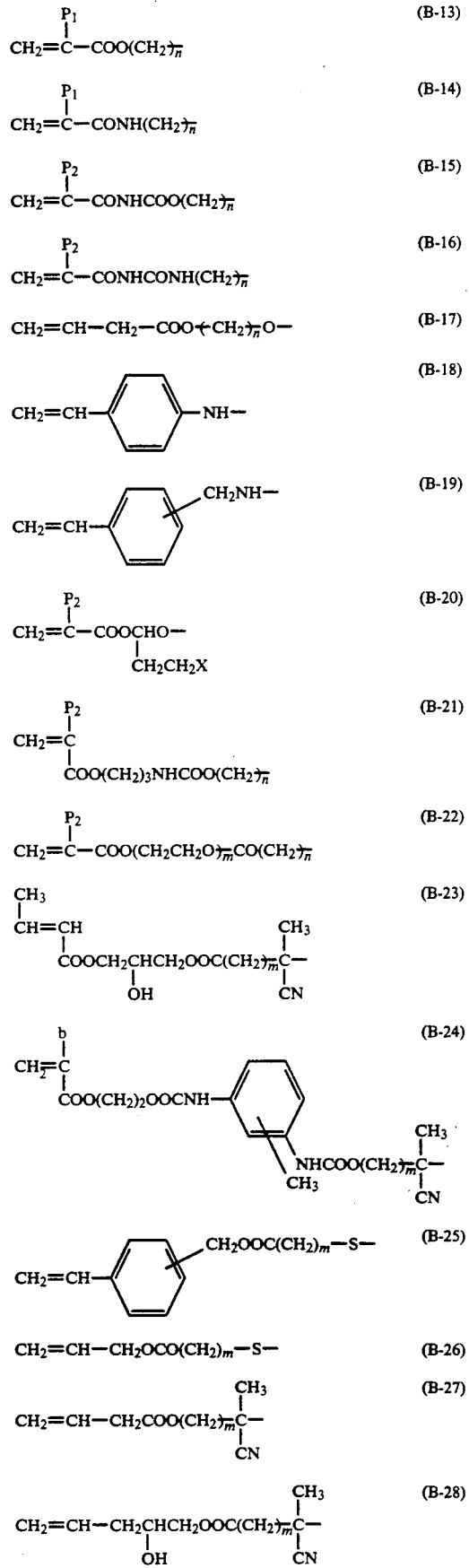

-continued

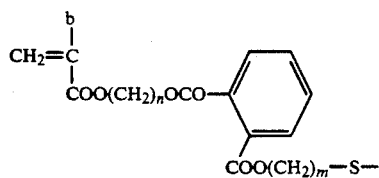 (B-29)

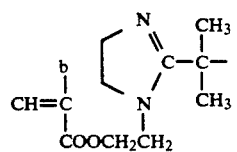 (B-30)

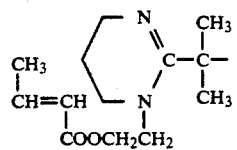 (B-31)

The content of the repeating unit having the fluorine and/or silicon atom-containing substituent in the monofunctional macromonomer (M) according to the present invention is preferably not less than 40% by weight, and more preferably from 60 to 100% by weight of the total repeating units.

If the content of the repeating unit is less than 40% by weight, the function upon which the resin is maldistributed in the surface portion of the photoconductive layer may decline, and as a result, the effect for improving the water retentivity of printing plate formed is reduced.

The monofunctional macromonomer (M) used for the graft-type copolymer according to the present invention can be produced by a conventionally known method such as, for example, (1) a method by an ion polymerization method, wherein a macromonomer is produced by reacting various reagents to the terminal of a living polymer obtained by an anion polymerization or a cation polymerization, (2) a method by a radical polymerization method, wherein a macromonomer is produced by reacting various reagents with a polymer having a reactive group such as a carboxy group, a hydroxy group, or an amino group, at the terminal thereof obtained by a radical polymerization using a polymerization initiator and/or a chain transfer agent each having the reactive group in the molecule, and (3) a method by a polyaddition condensation method of introducing a polymerizable double bond group into a polymer obtained by a polycondensation reaction or a polyaddition reaction, in the same manner as the above described radical polymerization method.

Specific methods for producing the macromonomer (M) are described, for example, in P. Dreyfuss & R. P. Quirk, *Encycl. Polym. Sci. Eng.*, 7, 551(1987), P. F. Rempp & E. Franta, *Adv. Polym. Sci.*, 58, 1(1984), V. Percec, *Appl. Polym. Sci.*, 285, 95(1984), R. Asami & M. Takaki, *Makromol. Chem. Suppl.*, 12, 163(1985), P. Rempp et al, *Makromol. Chem. Suppl.*, 8, 3(1984), Yusuke Kawakami, *Kagaku Kogyo (Chemical Industry)*, 38, 56(1987), Yuuya Yamashita, *Kobunshi (Macromolecule)*, 31, 988(1982), Shio Kobayashi, *Kobunshi (Macromolecule)*, 30, 625(1981), Toshinobu Higashimura, *Nippon Secchaku Kyokai Shi (Journal of Adhesive Society of Japan)*, 18, 536(1982), Koichi Ito, *Kobunshi Kako (Macromolecule Processing)*, 35, 262(1986), and Kishiro Higashi & Takashi Tsuda, *Kino Zairyo (Functional Materials)*, 1987, No. 10, 5, and the literatures and patents cited therein.

The graft-type copolymer according to the present invention is formed from at least one monofunctional macromonomer (M) and at least one monofunctional monomer (hereinafter sometimes referred to as monomer (A)), as a polymerizable component. Any monomer which is capable of conducting addition copolymerization with the monofunctional macromonomer (M) can be employed as the polymerizable component.

Of the monomers (A) copolymerizable with the monofunctional macromonomer (M), monofunctional monomers represented by the general formula (IIa) or (IIb) described below are preferred.

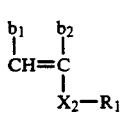 (IIa)

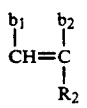 (IIb)

wherein $X_2$ has the same meaning as $X_1$ in the general formula (I); $R_1$ represents an aliphatic group having from 1 to 18 carbon atoms or an aromatic group having from 6 to 12 carbon atoms; $b_1$ and $b_2$, which may be the same or different, each has the same meaning as $a_1$ or $a_2$ in the general formula (I); and $R_2$ represents —CN, —CONH$_2$, or

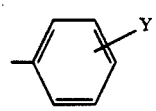

wherein Y represents a hydrogen atom, a halogen atom, an alkoxy group or —COOZ$_2$ (wherein Z$_2$ represents an alkyl group, an aralkyl group, or an aryl group).

Specific examples of the aliphatic group for $R_1$ include an alkyl group having from 1 to 18 carbon atoms which may be substituted (e.g., methyl, ethyl, propyl, butyl, pentyl, hexyl, heptyl, octyl, decyl, dodecyl, tridecyl, hexadecyl, octadecyl, 2-chloroethyl, 2-bromoethyl, 2-hydroxyethyl, 2-methoxyethyl, 2-ethoxyethyl, 2-cyanoethyl, 3-chloropropyl, 2-(trimethoxysilyl)ethyl, 2-tetrahydrofuryl, 2-thienylethyl, 2-N,N-dimethylaminoethyl, and 2-N,N-diethylaminoethyl), a cycloalkyl group having from 5 to 8 carbon atoms which may be substituted (e.g., cyclopentyl, cyclohexyl, and cyclooctyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, dichlorobenzyl, methylbenzyl, chloromethylbenzyl, dimethylbenzyl, trimethylbenzyl, and methoxybenzyl). Also, specific examples of the aromatic group for $R_1$ include an aryl group having from 6 to 12 carbon atoms which may be substituted (e.g., phenyl, tolyl, xylyl, mesityl, naphthyl, methoxyphenyl, ethoxyphenyl, chlorophenyl, dichlorophenyl, bromophenyl, dibromophenyl, chlorobromophenyl, acetoxyphenyl, acetylphenyl, chloromethylphenyl, bromomethylphenyl, cyanophenyl, and methoxycarbonylphenyl).

In the general formula (IIa), $X_2$ represents preferably —COO—, —OCO—, —CH$_2$COO—, —CH$_2$OCO—, —O—, CO—, —CONH—, —SO$_2$NH—, or

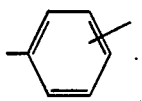

Also, preferred examples of $b_1$ and $b_2$ are same as those described above for $a_1$ and $a_2$ in the general formula (I).

In the general formula (IIb), $R_2$ represents —CN, —CONH$_2$, or

(wherein Y represents a hydrogen atom, a halogen atom (e.g., chlorine and bromine), an alkoxy group (e.g., methoxy, and ethoxy), or —COOZ$_2$ (wherein $Z_2$ preferably represents an alkyl group having from 1 to 8 carbon atoms, an aralkyl group having from 7 to 12 carbon atoms or an aryl group)).

The content of the monomer represented by the general formula (IIa) and/or (IIb) is preferably from 30 to 95% by weight, and more preferably from 40 to 90% by weight as a polymerizable component in the graft-type copolymer.

Further, the graft-type copolymer for use in the present invention may be formed from other monomer(s) as other polymerizable component(s) together with the above described monofunctional macromonomer(s) (M) and the above described monofunctional monomer(s) (A), preferably monomer(s) represented by the general formula (IIa) and/or (IIb).

Examples of such other monomers include α-olefins, naphthalene compounds having a vinyl group (e.g., vinylnaphthalene and 1-isopropenylnaphthalene), and heterocyclic compounds having a vinyl group (e.g., vinylpyridine, vinylpyrrolidone, vinylthiophene, vinyltetrahydrofuran, vinyl-1,3-dioxolane, vinylimidazole, vinylthiazole, and vinyloxazoline).

The content of such other monomers is preferably not more than 30% by weight of the graft-type copolymer.

Other examples of such other monomers are vinyl compounds having an acidic group (for example, —COOH, —PO$_3$H$_2$, —SO$_3$H,

—CHO or a cyclic acid anhydride-containing group).

The above described vinyl compounds having an acidic group are described, for example, in *Kobunshi (Macromolecule) Data Handbook Kisohen (Foundation)*, edited by Kobunshi Gakkai, Baifukan (1986).

Specific examples of the vinyl compound include acrylic acid, α- and/or β-substituted acrylic acids (e.g., α-acetoxy compound, α-acetoxymethyl compound, α-(2-amino)ethyl compound, α-chloro compound, α-bromo compound, α-fluoro compound, α-tributylsilyl compound, α-cyano compound, β-chloro compound, β-bromo compound, α-chloro-β-methoxy compound, and α, β-dichloro compound), methacrylic acid, itaconic acid, itaconic acid half esters, itaconic acid half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic acid half esters, maleic acid half amides, vinylbenzenecarboxylic acid, vinylbenzensulfonic acid, vinylsulfonic acid, vinylphosphonic acid, half ester derivatives of the vinyl group or allyl group of dicarboxylic acids, and the ester derivatives or amide derivatives of the above described carboxylic acid or sulfonic acid having an acidic group in the substituent thereof.

In the group of

$R_0$ represents $R_0'$ or —$OR_0'$; and $R_0'$ has the same meaning as $R_1$ defined in the general formula (IIa) above.

The content of the vinyl compounds having an acidic group is suitably not more than 15% by weight, preferably not more than 10% by weight of the graft-type copolymer.

Furthermore, the graft-type copolymer according to the present invention may be formed from a polymerizable component corresponding to a monomer which is capable of copolymerizing with the monofunctional macromonomer (M) and contains a heat- and/or photo-curable functional group. The content of the heat- and/or photo-curable functional group is preferably not more than 20% by weight of the graft-type copolymer.

The term "heat- and/or photo-curable functional group" used in the present invention means a functional group capable of inducing curing of the resin by the action of at least one of heat and light.

Suitable examples of the heat-curable functional group (i.e., functional group capable of performing a heat-curing reaction) include functional groups as described, for example, in Tsuyoshi Endo, *Netsukakosei Kobunshi no Seimitsuka*, C.M.C. (1986), Yuji Harasaki, *Saishin Binder Gijutsu Binran*, Ch. II-I, Sogo Gijutsu Center (1985), Takayuki Ohtsu, *Acryl Jushi no Gosei Sekkei to Shin-Yotokaihatsu*, Chubu Keiei Kaihatsu Center Shuppanbu (1985), and Eizo Ohmori, *Kinosei Acryl Jushi*, Techno System (1985).

Specific examples of the heat-curable functional groups which can be used include —OH, —SH, —NH$_2$, —NHR$_{21}$ (wherein R$_{21}$ represents a hydrocarbon group which has the same meaning as that defined for $d_1$ in the general formula (I) above),

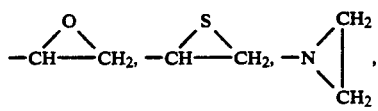

—CONHCH$_2$OR$_{22}$ (wherein R$_{22}$ represents a hydrogen atom or an alkyl group having from 1 to 8 carbon atoms (e.g., methyl, ethyl, propyl, butyl, hexyl, and octyl), —N=C=O, and

(wherein $\gamma_1$ and $\gamma_2$ each represents a hydrogen atom, a halogen atom (e.g., chlorine, and bromine) or an alkyl group having from 1 to 4 carbon atoms (e.g., methyl, and ethyl). Also, specific examples of the polymerizable double bond group used include $CH_2=CH-$, $CH_2=CH-CH_2-$,

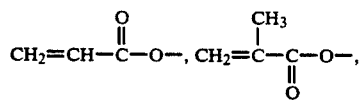

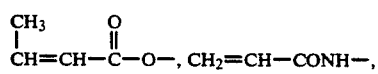

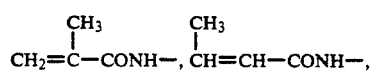

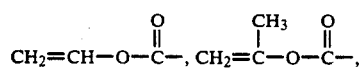

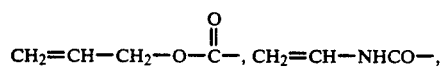

$CH_2=CH-CH_2-NHCO-$, $CH_2=CH-SO_2-$, $CH_2=CH-CO-$, $CH_2=CH-O-$, and $CH_2=CH-S-$.

Suitable examples of the photo-curable functional group include functional groups as described, for example, in Takahiro Tsunoda, *Kankosei Jushi*, Insatsu Gakkai Shuppanbu (1972), Gentaro Nagamatsu & Hideo Inui, *Kankosei Kobunshi*, Kodansha (1977), and G. A. Delgenne, *Encyclopedia of Polymer Science and Technology Supplement*, Vol. I (1976).

Specific examples of the photo-curable functional group include an addition polymerizing group such as an allyl ester group or a vinyl ester group, and a dimerizing group such as a cinnamoyl group or a maleimide ring group which may be substituted.

Where the resin according to the present invention contains the heat-curable functional group described above, a reaction accelerator may be used, if desired, in order to accelerate a crosslinking reaction in the light-sensitive layer. Examples of reaction accelerators which can be employed in the reaction system for forming a chemical bond between functional groups include an organic acid (e.g., acetic acid, propionic acid, butyric acid, benzenesulfonic acid, and p-toluenesulfonic acid), and a crosslinking agent.

Specific examples of crosslinking agents are described, for example, in Shinzo Yamashita and Tosuke Kaneko (ed.), *Kakyozai Handbook*, Taiseisha (1981), including commonly employed crosslinking agents, such as organosilanes, polyurethanes, and polyisocyanates, and curing agents, such as epoxy resins and melamine resins.

Where the crosslinking reaction is a polymerization reaction system, polymerization initiators (e.g., peroxides and azobis series polymerization initiators, and preferably azobis series polymerization initiators) and monomers having a polyfunctional polymerizable group (e.g., vinyl methacrylate, allyl methacrylate, ethylene glycol diacrylate, polyethylene glycol diacrylate, divinylsuccinic acid esters, divinyladipic acid esters, diallylsuccinic acid esters, 2-methylvinyl methacrylate, and divinylbenzene) can be used as the reaction accelerator.

When the binder resin containing a heat-curable functional group is employed in the present invention, the photoconductive substance-binder resin dispersed system is subjected to heat-curing treatment. The heat-curing treatment can be carried out by drying the photoconductive coating under conditions severer than those generally employed for the preparation of conventional photoconductive layer. For example, the heat-curing can be achieved by treating the coating at a temperature of from 60° to 120° C. for 5 to 120 minutes. In this case, the treatment can be performed under milder conditions using the above described reaction accelerator.

It is preferred that the monofunctional monomer (A) substantially does not contain the hydrophilic group-forming functional group as contained in the macromonomer (M).

In forming the graft-type copolymer according to the present invention, the content of the polymerizable component corresponding to the macromonomer (M) containing the specific hydrophilic group-forming functional group is preferably from 5 to 70% by weight, more preferably from 10 to 60% by weight of the total polymerizable components. On the other hand, the content of the polymerizable component corresponding to the monomer (A) is preferably from 30 to 95% by weight, more preferably 40 to 90% by weight. Further, the contents of polymerizable components other than those of the macromonomer (M) and the monomer (A) are those as described hereinbefore.

The weight average molecular weight of the graft-type copolymer is preferably from $1 \times 10^3$ to $1 \times 10^6$, more preferably from $5 \times 10^3$ to $5 \times 10^5$, If the content of the monomer (A) is less than 30% by weight or the content of the macromonomer (M) is more than 70% by weight, the effect for improving the water retentivity of an offset printing plate prepared from the electrophotographic lithographic printing plate precursor is reduced. On the other hand, if the content of the monomer (A) is more than 95% by weight or the content of the macromonomer (M) is less than 5% by weight, the effect for improving the water retentivity may not be maintained when a large number of prints have been made.

In the electrophotographic lithographic printing plate precursor according to the present invention, the graft-type copolymer can be used alone or together with one or more of other conventionally known resins, as a binder resin of the photoconductive layer.

Resins used together with the graft-type copolymer according to the present invention include alkyd resins, vinyl acetate resins, polyester resins, styrenebutadiene resins, and acryl resins, and more specifically, these described, for example, in Ryuji Kurita & Jiro Ishiwatari, *Kobunshi*, 17, 278 (1968), Harumi Miyamoto & Hidehiko Takei, *Imaging*, No. 8, 9 (1973).

Preferred examples of the resins include random copolymers containing a methacrylate as a polymerizable component which are known as binder resins in electrophotographic light-sensitive materials using photoconductive zinc oxide as an inorganic photoconductive substance. Such resins are described, for example, in JP-B-50-2242, JP-B 50-31011, JP-A-50-98324, JP-A-50-98325, JP-B-54-13977, JP-B-59-35013, JP-A-54-20735, and JP-A-57-202544.

Further, binder resins composed of a combination of a random copolymer having a weight average molecular weight of not more than 20,000 and comprising a methacrylate monomer and an acidic group-containing monomer with a resin having a weight average molecular weight of not less than 30,000 or a heat- and/or photocurable compound as described, for example, in JP-A-63-220148, JP-A-63-220149, JP-A-2-34860, JP-A-64-564, JP-A-1-100554, JP-A-1-211766, JP-A-2-40660, JP-A-2-53064, JP-A-2-56558, JP-A-1-102573, JP-A-2-69758, JP-A-2-68561, JP-A-2-68562, and JP-A-2-69759 can be used together with the graft-type copolymer. Also, binder resins composed of a combination of a polymer having a weight average molecular weight of not more than 20,000, comprising a methacrylate component and having an acidic group at one terminal of the main chain thereof with a resin having a weight average molecular weight of not less than 30,000 or a heat- and/or photo-curable compound as described, for example, in JP-A-1-169455, JP-A-1-116643, JP-A-1-280761, JP-A-1-214865, JP-A-2-874, JP-A 2-34859, JP-A-2-96766, JP-A-2-103056, JP-A-2-167551, JP-A-2-135455, JP-A-2-135456 and JP A-2-135457 can be used together with the graft-type copolymer.

When the graft-type copolymer according to the present invention is used together with other resins as described above, a ratio of them can be appropriately selected. However, the ratio of the graft-type copolymer is preferably from 0.5 to 60% by weight, more preferably from 5 to 50% by weight of the total binder resin used.

In the present invention, photoconductive zinc oxide is used as a photoconductive substance, but other inorganic photoconductive substance, for example, titanium oxide, zinc sulfide, cadmium sulfide, cadmium carbonate, zinc selenide, cadmium selenide, tellurium selenide or lead sulfide can be used together with zinc oxide. In such a case, however, the amount of the other inorganic photoconductive substances is not more than 40% by weight, preferably not more than 20% by weight of the photoconductive zinc oxide used. When the amount of the other inorganic photoconductive substances exceeds 40% by weight, the effect for increasing the hydrophilic property in the non-image areas of the lithographic printing plate formed decreases.

The total amount of the binder resin used for the inorganic photoconductive substance is from 10 to 100 parts by weight, and preferably from 15 to 50 parts by weight, per 100 parts by weight of the photoconductive substance.

In the present invention, various kinds of dyes can be used as spectral sensitizers for the inorganic photoconductive substance, if desired. Examples of these dyes include carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), and phthalocyanine dyes (which may contain metals) described in Harumi Miyamoto and Hidehiko Takei, *Imaging*, 1973, (No. 8), 12, C. J. Young et al, *RCA Review*, 15, 469 (1954), Kohei Kiyota, *Journal of Electric Communication Society of Japan*, J 63 C [No. 2), 97 (1980), Yuji Harasaki et al, *Kogyo Kagaku Zasshi*, 66, 78 and 188 (1963), and Tadaaki Tani, *Journal of the Society of Photographic Science and Technology of Japan*, 35, 208 (1972).

Specific examples of suitable carbonium dyes, triphenylmethane dyes, xanthene dyes, and phthalein dyes are described, for example, in JP-B-51-452, JP-A-50-90334, JP-A-50-114227, JP-A-53-39130, JP-A-53-82353, U.S. Pat. Nos. 3,052,540 and 4,054,450 and JP-A-57-16456.

The polymethine dyes such as oxonol dyes, merocyanine dyes, cyanine dyes, and rhodacyanine dyes which can be used include those described, for example, in F. M. Hamer, *The Cyanine Dyes and Related Compounds*, and, more specifically, the dyes described, for example, in U.S. Pat. Nos. 3,047,384, 3,110,591, 3,121,008, 3,125,447, 3,128,179, 3,132,942, and 3,622,317, British Patents 1,226,892, 1,309,274, and 1,405,898, JP-B-48-7814 and JP-B-55-18892.

Furthermore, polymethine dyes capable of spectrally sensitizing in the wavelength region of from near infrared to infrared longer than 700 nm are those described, for example, in JP-A-47-840, JP-A-47-44180, JP-B-51-41061 JP-A-49-5034, JP-A-49-45122, JP-A-57-46245, JP-A-56-35141, JP-A-57-157254, JP-A-61-26044, JP-A-61-27551, U.S. Pat. Nos. 3,619,154 and 4,175,956, and *Research Disclosure*, 216, 117 to 118 (1982).

The light-sensitive material of the present invention is excellent in that, even when various sensitizing dyes are used for the photoconductive layer, the performance thereof is not liable to vary by such sensitizing dyes.

Further, if desired, the photoconductive layers may further contain various additives commonly employed in electrophotographic light-sensitive layer, such as chemical sensitizers. Examples of such additives include electron-acceptive compounds (e.g., halogen, benzoquinone, chloranil, acid anhydrides, and organic carboxylic acids) as described, for example, in *Imaging*, 1973, (No. 8), page 12, and polyarylalkane compounds, hindered phenol compounds, and p-phenylenediamine compounds as described in Hiroshi Kokado et al, *Recent Photoconductive Materials and Development and Practical Use of Light-sensitive Materials*, Chapters 4 to 6, Nippon Kagaku Joho K.K. (1986).

There is no particular restriction on the amount of these additives, but the amount thereof is usually from 0.0001 to 2.0 parts by weight per 100 parts by weight of the photoconductive substance.

The thickness of the photoconductive layer is from 1 $\mu$m to 100 $\mu$m, and preferably from 10 $\mu$m to 50 $\mu$m.

Also, when the photoconductive layer is used as a charge generating layer of a double layer type electrophotographic light-sensitive material having the charge generating layer and a charge transporting layer, the thickness of the charge generating layer is from 0.01 $\mu$m to 1 $\mu$m, and preferably from 0.05 $\mu$m to 0.5 $\mu$m.

As the charge transporting materials for the double layer type light-sensitive material, there are polyvinylcarbazole, oxazole dyes, pyrazoline dyes, and triphenylmethane dyes. The thickness of the charge transporting layer is from 5 $\mu$m to 40 $\mu$m, and preferably from 10 $\mu$m to 30 $\mu$m.

Resins which can be used for the charge transporting layer typically include thermoplastic and thermosetting resins such as polystyrene resins, polyester resins, cellulose resins, polyether resins, vinyl chloride resins, vinyl acetate resins, vinyl chloridevinyl acetate copolymer resins, polyacryl resins, polyolefin resins, urethane resins, epoxy resins, melamine resins, and silicone resins.

The photoconductive layer according to the present invention can be provided on a conventional support. In general, the support for the electrophotographic light-sensitive material is preferably electroconductive. As the electroconductive support, there are base materials such as metals, paper, and plastic sheets rendered electroconductive by the impregnation of a low resistant substance, the base materials the back surface of which (the surface opposite to the surface of providing a photoconductive layer) is rendered electroconductive and having coated with one or more layer for preventing the occurrence of curling of the support, the above-described support having formed on the surface a water-resistant adhesive layer, the above-described support having formed on the surface at least one precoat, and a support formed by laminating on paper a plastic film rendered electroconductive by vapor depositing thereon aluminum.

More specifically, the electroconductive base materials or conductivity-imparting materials as described, for example, in Yukio Sakamoto, *Denshi Shashin (electrophotography)*, 14 (No. 1), 2–11 (1975), Hiroyuki Moriga, *Introduction for Chemistry of Specific Paper*, Kobunshi Kankokai, 1975, and M. F. Hoover, *J. Macromol. Sci. Chem.*, A-4 (6), 1327–1417 (1970) can be used.

The production of a lithographic printing plate from the electrophotographic lithographic printing plate precursor of the present invention can be carried out in a conventional manner. More specifically, the duplicated images are formed on the electrophotographic lithographic printing plate precursor according to the present invention and then the non-image areas are subjected to an oil-desensitizing treatment to prepare a lithographic printing plate. In the oil-desensitizing treatment, both of an oil-densitizing reaction of zinc oxide (hereinafter referred to as Reaction A) and an oil-desensitizing reaction of the resin (hereinafter referred to as Reaction B) proceed. The oil-desensitizing treatment can be carried out by any of (a) a method comprising effecting Reaction A and thereafter Reaction B, (b) a method comprising effecting Reaction B and thereafter Reaction A, and (c) a method comprising effecting simultaneously Reactions A and B.

In the method for the oil-desensitizing treatment of zinc oxide, there can be used any of known processing solutions, for example, those containing, as a main oil-desensitizing component, a ferrocyanide compound as described, for example, in JP-A-62-239158, JP-A-62-292492, JP-A-63-99993, JP-A-63-99994, JP-B-40-7334, JP-B-45-33683, JP-A-57-107889, JP-B-46-21244, JP-B-44-9045, JP-B-47-32681, JP B-55-9315 and JP-A-52-101102; those containing a phytic acid compound as described, for example, JP-B-43-28408, JP-B-45-24609, JP-A-51-103501, JP-A-54-10003, JP-A-53-83805, JP-A-53-83806, JP-A-53-127002, JP-A-54-44901, JP-A-56-2189, JP-A-57-2796, JP-A-57-20394 and JP-A-59-207290; those containing a water-soluble polymer capable of forming a metal chelate as described, for example, in JP-B-38-9665, JP-B-39-22263, JP-B-40-763, JP-B-43-28404, JP-B-47-29642, JP-A-52-126302, JP-A-52-134501, JP-A-53-49506, JP-A-53-59502 and JP-A-53-104302; those containing a metal complex compound as described, for example, in JP-A-53-104301, JP B-55-15313 and JP-B-54-41924; and those containing an inorganic or organic acid compound as described, for example, in JP-B-39-13702, JP-B-40-10308, JP-B-46-26124, JP-A-51-118501 and JP-A-56-111695.

On the other hand, the oil-desensitizing treatment (i.e., generation of hydrophilic property) of the resin according to the present invention containing the functional groups capable of forming hydrophilic groups through decomposition can be accomplished by a method of treating with a processing solution to hydrolyze or a method of irradiating with light to decompose.

The processing solution is composed of an aqueous solution containing a pH controlling agent which can adjust a pH of the processing solution to the desired value. The pH of the processing solution can be widely varied depending on the kind of the hydrophilic group-forming functional groups present in the binder resin and range form 1 to 13.

In addition to the above described pH controlling agent, the processing solution may contain other compounds, for example, a water-soluble organic solvent in a proportion of from 1 to 50 parts by weight to 100 parts by weight of water. Suitable examples of the organic solvents include an alcohol (for example, methanol, ethanol, propanol, propargyl alcohol, benzyl alcohol, or phenethyl alcohol), a ketone (for example, acetone, methyl ethyl ketone, or acetophenone), an ether (for example, dioxane, trioxane tetrahydrofuran, ethylene glycol, propylene glycol, ethylene glycol monomethyl ether, propylene glycol monomethyl ether, or tetrahydropyran), an amide (for example, dimethylformamide, or dimethylacetamide), an ester (for example, methyl acetate, ethyl acetate, or ethyl formate). The organic solvents can be used individually or as a mixture of two or more thereof.

Furthermore, a surfactant can be incorporated into the processing solution in a proportion of from 0.1 to 20 parts by weight to 100 parts by weight of water. Suitable examples of the surfactants include anionic, cationic and nonionic surfactants well known in the art, for example, those described in Hiroshi Horiguchi "New Surfactants (Shin-Kaimen Kasseizai)" Sankyo Shuppan KK (1975), and Ryohei Oda and Kazuhiro Teramura "Synthesize of Surfactants and Applications Thereof (Kaimen Kasseizai no Gosei to Sono Oyo)" Maki Shoten (1980).

The scope of the present invention should not be construed as being limited to the above described specific compounds.

With respect to the conditions of the treatment, a processing temperature is preferably from 15° to 60° C. and a processing time is preferably from 10 seconds to 5 minutes.

In a case wherein the specific functional group present in the resin according to the present invention is decomposed upon irradiation by light, it is preferred to insert a step of irradiation by a chemically active ray after the formation of toner image at plate making. More specifically, after electrophotographic development, the irradiation is conducted either simultaneously with fixing of the toner image, or after fixing of toner image according to a conventionally known fixing method using, for example, heat, pressure or solvent.

The term "chemically active ray" used in the present invention can be any of visible ray, ultraviolet ray, far ultraviolet ray, electron beam, X-ray, $\gamma$-ray and $\alpha$-ray. Among them, ultraviolet ray is preferred, and ray having a wavelength of from 310 nm to 500 nm is more preferred. A high-pressure or super high-pressure mercury lamp is usually employed. The treatment of irradiation is ordinarily conducted at a distance of from 5 cm to 50 cm and for a period of from 10 seconds to 10 minutes.

In accordance with the present invention, the electrophotographic lithographic printing plate precursor which is excellent in electrostatic characteristics (particularly, dark charge retention property and photosensitivity), is capable of reproducing a faithful duplicated image to the original, forms neither overall background stains nor dotted background stains of prints, and has excellent printing durability can be obtained. Further, the printing plate precursor is suitable for use in a scanning exposure system using a semiconductor laser beam.

The present invention will now be illustrated in greater detail with reference to the following examples, but it should be understood that the present invention is not to be construed as being limited thereto.

SYNTHESIS EXAMPLE MM-1

Synthesis of Macromonomer (MM-1)

A mixed solution of 95 g of 2,2,2,2',2',2'-hexafluoroisopropyl methacrylate, 5 g of thioglycolic acid, and 200 g of toluene was heated to 70° C. with stirring under nitrogen gas stream. To the mixture was added 1.0 g of 2,2'-azobisisobutyronitrile (hereinafter simply referred to as AIBN) to conduct a reaction for 8 hours. To the reaction mixture were then added 8 g of glycidyl methacrylate, 1.0 g of N,N-dimethyldodecylamine, and 0.5 g of tert-butylhydroquinone, followed by stirring at 100° C. for 12 hours. After cooling, the reaction mixture was reprecipitated from 2 l of methanol to obtain 82 g of Macromonomer (MM-1) having a weight average molecular weight (hereinafter simply referred to as Mw) of $4.0 \times 10^3$ as white powder.

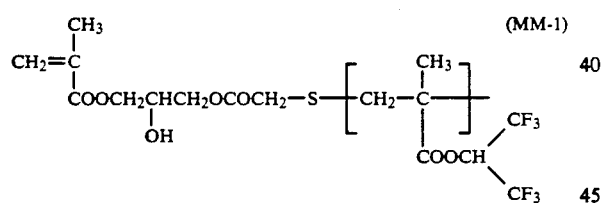

(MM-1)

SYNTHESIS EXAMPLE MM-2

Synthesis of Macromonomer (MM-2)

A mixed solution of 96 g of Monomer (A-1) shown below, 4 g of β-mercaptopropionic acid, and 200 g of toluene was heated to 70° C. with stirring under nitrogen gas stream.

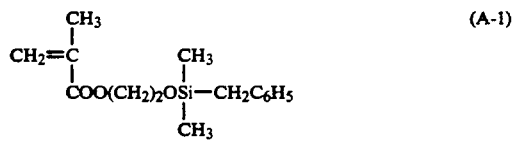

(A-1)

After cooling the reaction solution to 25° C. in a water bath, 10 g of 2-hydroxyethyl methacrylate was added thereto. Then, a mixed solution of 14 g of dicyclohexylcarbodiimide (hereinafter simply referred to as DDC), 0.2 g of 4-(N,N-dimethylamino)pyridine and 50 g of methylene chloride was added dropwise thereto with stirring over a period of 30 minutes, followed by stirring for 4 hours. To the reaction mixture was added 5 g of formic acid, the mixture was stirred for one hour, and the insoluble substance was removed by filtration. The filtrate obtained was reciprocated from on liter of n-hexane, and the viscous substance thus-deposited was collected by decantation and dissolved in 100 ml of tetrahydrofuran. After removing the insoluble substance by filtration, the filtrate was reprecipitated from one liter of n-hexane, and the viscous substance thus-deposited was collected and dried to obtain 60 g of Macromonomer (MM-2) having an Mw of $5.2 \times 10^3$ as the colorless viscous substance.

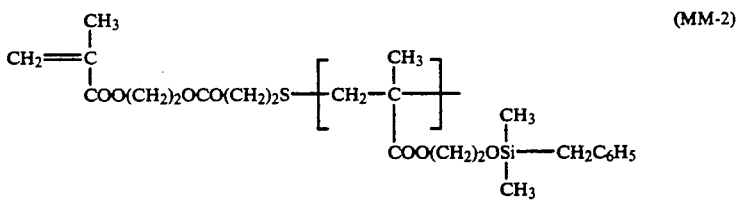

(MM-2)

SYNTHESIS EXAMPLE MM-3

Synthesis of Macromonomer (MM-3)

A mixed solution of 95 g of Monomer (A-2) shown below, 150 g of benzotrifluoride and 50 g of ethanol was heated to 75° C. with stirring under nitrogen gas stream.

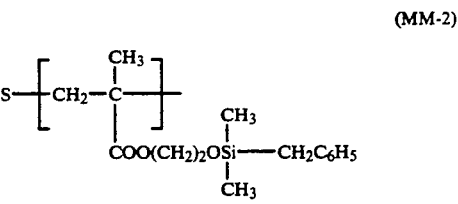

(A-2)

To the mixture was added 3 g of 4,4'-azobis(4-cyanovaleric acid) (hereinafter simply referred to as ACV), followed by reacting for 8 hours. After cooling, the reaction mixture was reprecipitated from one liter of methanol, and the polymer thus-obtained was collected and dried.

50 g of the resulting polymer, and 8 g of 2-hydroxyethyl methacrylate were dissolved in 150 g of benzotrifluoride and to the mixture was added dropwise with stirring at 25° C. a mixed solution of 10 g of DCC, 0.1 g of 4-(N,N-dimethylamino)pyridine and 30 g of methylene chloride over a period of 30 minutes, followed by stirring for 4 hours. To the reaction mixture was added 3 g of formic acid, the mixture was stirred for one hour, and the insoluble substance was removed by filtration. The filtrate obtained was reprecipitated from 800 ml of methanol, and the precipitates were collected, dissolved in 150 g of benzotrifluoride (MM-3) having an Mw of $3.3 \times 10^3$ as the viscous substance.

(MM-3)

SYNTHESIS EXAMPLES MM-4 TO MM-22

Synthesis of Macromonomers (MM-4) to (MM-22)

Macromonomers (MM-4) to (MM-22) were prepared in the same manner as in Synthesis Example MM-2, except for replacing Monomer (A-1) with each of the monomers corresponding to the polymerizable components shown in Table 1 below. An Mw of each macromonomer was in the range of from $4 \times 10^3$ to $6 \times 10^3$.

TABLE 1

$$CH_2=\underset{\underset{COO(CH_2)_2OCO(CH_2)_2S}{|}}{\overset{\overset{CH_3}{|}}{C}}-[\underset{\underset{W_1}{|}}{\overset{a_1}{\underset{|}{CH}}}-\overset{a_2}{\underset{|}{C}}]-$$

| Synthesis Example No. | Macromonomer (M) | $a_1$ | $a_2$ | $-W_1$ |
|---|---|---|---|---|
| MM-4 | (MM-4) | H | $CH_3$ | $-COOCH_2CF_3$ |
| MM-5 | (MM-5) | H | $CH_3$ | $-COO(CH_2)_2SO_2-N\underset{succinimide\ with\ C_4F_9}{}$ |
| MM-6 | (MM-6) | H | H | $-C_6H_4-SO_2O(CH_2)_2SO_2C_3F_7$ |
| MM-7 | (MM-7) | $CH_3$ | H | $-COOSi(CH_3)_2-C_4H_9$ |
| MM-8 | (MM-8) | H | H | $-COO(CH_2)_2O-P(=O)(O(CH_2)_2SO_2C_2F_5)_2$ |
| MM-9 | (MM-9) | H | $CH_3$ | $-COOC(CF_3)_2-C_6H_5$ |
| MM-10 | (MM-10) | H | H | $-SO_2OCH(CF_3)_2$ |
| MM-11 | (MM-11) | H | H | $-COOCH_2CH(OSi(CH_3)_3)CH_2O-Si(CH_3)_3$ |
| MM-12 | (MM-12) | H | $CH_3$ | $-COO(CH_2)_3SO_2O(CH_2)_2SO_2C_3F_7$ |
| MM-13 | (MM-13) | H | $CH_3$ | $-COON=C(CF_3)_2$ |
| MM-14 | (MM-14) | H | $CH_3$ | $-COOCH(COOCH_2CF_3)_2$ |
| MM-15 | (MM-15) | H | $CH_3$ | $-COO-C_6H_3(CF_3)_2$ |

TABLE 1-continued $$CH_2=C(CH_3)-COO(CH_2)_2OCO(CH_2)_2S-[CH(a_1)-C(a_2)(W_1)]-$$

| Synthesis Example No. | Macromonomer (M) | $a_1$ | $a_2$ | $-W_1$ |
|---|---|---|---|---|
| MM-16 | (MM-16) | H | H | $-COO-C_6F_4-F$ (pentafluorophenyl ester) |
| MM-17 | (MM-17) | H | H | $-CH_2OCOC_3F_7$ |
| MM-18 | (MM-18) | H | H | $-COO(CH_2)_2SO_2O-N=C(CF_3)_2$ |
| MM-19 | (MM-19) | H | H | $-C_6H_4-O-Si(CH_3)_2-C_6H_5$ |
| MM-20 | (MM-20) | H | H | $-COOCH_2CH(OCOC_2F_5)CH_2OCOC_2F_5$ |
| MM-21 | (MM-21) | H | H | $-CH_2SO_2ON=C(CH_3)-C_6H_4-CF_3$ |
| MM-22 | (MM-22) | $CH_3$ | H | $-COOCH(CF_3)-COO(CH_2)_2C(CF_3)_3$ |

SYNTHESIS EXAMPLES MM-23 TO MM-30

Synthesis of Macromonomers (MM-23) to (MM-30)

Macromonomers (MM-23) to (MM-30) were prepared in the same manner as in Synthesis Example MM-2, except for replacing Monomer (A-1) and 2-hydroxyethyl methacrylate with each of the compounds corresponding to the polymerizable components shown in Table 2 below. An Mw of each macromonomer was in the range of from $5 \times 10^3$ to $6 \times 10^3$.

TABLE 2

$$Ⓡ-CO(CH_2)_2S-[CH(a_3)-C(a_4)(W_2)]-$$

| Synthesis Example No. | Macromonomer (M) | Ⓡ | $a_3$ | $a_4$ | $-W_2$ |
|---|---|---|---|---|---|
| MM-23 | (MM-23) | $CH_2=CH-COO(CH_2)_2O-$ | H | $CH_3$ | $-COOCH(CF_3)_2$ |
| MM-24 | (MM-24) | $CH_2=CH-COO(CH_2)_2O-$ | H | $CH_3$ | $-COOSi(C_3H_7)_3$ |

TABLE 2-continued $$\text{Ⓡ}-CO(CH_2)_2S-\left[CH-C\atop{a_3\ a_4}\right]-W_2$$

| Synthesis Example No. | Macromonomer (M) | Ⓡ | $a_3$ | $a_4$ | $-W_2$ |
|---|---|---|---|---|---|
| MM-25 | (MM-25) | $CH_2=CH$<br>$\|$<br>$COO(CH_2)_2O-$ | $CH_3$ | H | $-COOCH_2CHCH_2OCOCF_3$<br>$\|$<br>$OCOCF_3$ |
| MM-26 | (MM-26) | $CH_2=CH$<br>$\|$<br>$CH_2O-$ | H | H | $-\!\!\langle\bigcirc\rangle\!\!-OCOC_3F_7$ |
| MM-27 | (MM-27) | $CH_2=CH$<br>$\|$<br>$COO(CH_2)_2COO(CH_2)_2O-$ | H | $CH_3$ | $-COO(CH_2)_2SO_2O(CH_2)_2SO_2C_3F_7$ |
| MM-28 | (MM-28) | $CH_3$<br>$\|$<br>$CH=CH_2$<br>$\|$<br>$COO(CH_2)_2O-$ | H | H | $-\!\!\langle\bigcirc\rangle\!\!-SO_2OCH\!<^{CF_3}_{CF_3}$ |
| MM-29 | (MM-29) | $CH_2=CH-\!\!\langle\bigcirc\rangle\!\!-CH_2O-$ | H | $CH_3$ | $-COOCH_2CH-O\phantom{xx}C_2H_5$<br>$\phantom{xxxxxxxxx}\|\phantom{xxx}\diagdown\!\!\!/$<br>$\phantom{xxxxxxxxx}\phantom{xx}Si$<br>$\phantom{xxxxxxxxx}\diagup\phantom{xxx}\diagdown$<br>$\phantom{xxxxxx}CH_2-O\phantom{xx}C_2H_5$ |
| MM-30 | (MM-30) | $CH_2=CH$<br>$\|$<br>$CONH(CH_2)_2O-$ | H | H | $-COOCH_2CHCH_2OSi(C_2H_5)_3$<br>$\|$<br>$OSi(C_2H_5)_3$ |

SYNTHESIS EXAMPLE GP-1

Synthesis of Binder Resin (GP-1)

A mixed solution of 65 g of benzyl methacrylate, 35 g of Macromonomer (MM-1) and 200 g of toluene was heated to 75° C. under nitrogen gas stream. Then, 1.0 g of AIBN was added to the reaction mixture, the reaction was carried out for 4 hours, and further 0.6 g of AIBN was added thereto, the reaction was carried out for 4 hours. An Mw of the resulting polymer was $6\times10^4$.

SYNTHESIS EXAMPLE GP-2

Synthesis of Binder Resin (GP-2)

A mixed solution of 60 g of ethyl methacrylate, 40 g of Macromonomer (MM-2) and 200 g of tetrahydrofuran was heated to 60° C. under nitrogen gas stream. Then, 1.5 g of 2,2'-azobisvaleronitrile (hereinafter simply referred to as ABVN) was added to the reaction mixture, the reaction was carried out for 4 hours, and further 0.8 g of ABVN was added thereto, the reaction was carried out for 4 hours. An Mw of the resulting Binder Resin (GP-1):

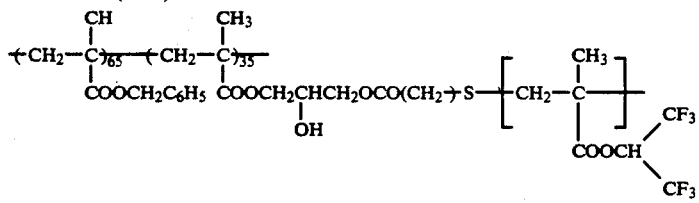

polymer was $6.5\times10^4$.

Binder Resin (GP-2):

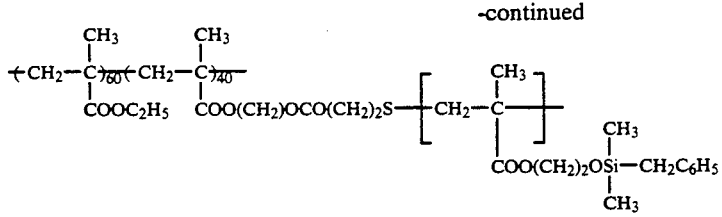

SYNTHESIS EXAMPLE GP-3

Synthesis of Binder Resin (GP-3)

A mixed solution of 39 g of methyl methacrylate, 20 g of methyl acrylate, 30 g of Macromonomer (MM-3), 1.0 g of acrylic acid and 250 g of toluene was prepared and then subjected to the polymerization reaction in the same manner as described in Synthesis Example GP-1. An Mw of the resulting polymer was $5.3 \times 10^4$.

Binder Resin (GP-3):

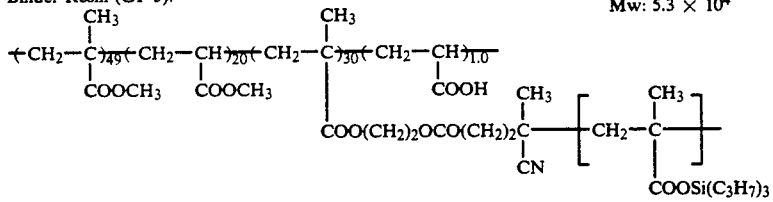

SYNTHESIS EXAMPLES GP-4 TO GP-15

Synthesis of Binder Resins (GP-4) to (GP-15)

Binder Resins (GP-4) to (GP-15) were prepared in the same manner as in Synthesis Example GP-3, except for replacing the monomers and macromonomer with each of the compounds shown in Table 3 below. An Mw of each binder resin was in a range of from $4.5 \times 10^4$ to $6 \times 10^4$.

erage of 20 g/m², followed by drying at 100° C. for 3 minutes. The coated material was allowed to stand in a dark place at 20° C. and 65% RH (relative humidity) for 24 hours to prepare an electrophotographic light-sensitive material.

Binder Resin (B-1):

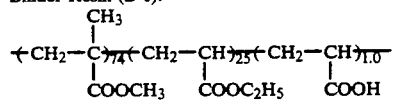

Mw: $5.3 \times 10^4$ (weight ratio)

EXAMPLE 2

An electrophotographic light-sensitive material was prepared in the same manner as described in Example 1 except for using 5.7 g of Binder Resin (B-2) shown below and 32.3 g of Binder Resin (B-3) shown below in place of 38 g of Binder Resin (B-1).

Binder Resin (B-2):

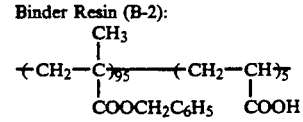

Mw: $6.0 \times 10^3$ (weight ratio)

Binder Resin (B-3):

TABLE 3

| Synthesis Example No. | Binder Resin | Monomer (A) | | Other Monomer | | Macromonomer (M) |
|---|---|---|---|---|---|---|
| GP-4 | (GP-4) | Ethyl methacrylate | (70) | — | | MM-5 (30) |
| GP-5 | (GP-5) | Butyl methacrylate | (75) | — | | MM-6 (25) |
| GP-6 | (GP-6) | 2-Chlorophenyl methacrylate | (55) | Benzyl acrylate | (15) | MM-8 (30) |
| GP-7 | (GP-7) | Methyl methacrylate | (70) | — | | MM-11 (30) |
| GP-8 | (GP-8) | Ethyl methacrylate | (60) | — | | MM-13 (40) |
| GP-9 | (GP-9) | " | (60) | — | | MM-18 (40) |
| GP-10 | (GP-10) | 2-Methylphenyl methacrylate | (30) | Methyl acrylate | (20) | MM-19 (50) |
| GP-11 | (GP-11) | 2,6-Dichlorophenyl methacrylate | (80) | — | | MM-21 (20) |
| GP-12 | (GP-12) | 2-Acetoxyphenyl methacrylate | (69) | Methacrylic acid | (1.0) | MM-22 (30) |
| GP-13 | (GP-13) | Benzyl methacrylate | (60) | Phenyl methylacrylate | (15) | MM-24 (25) |
| GP-14 | (GP-14) | Ethyl methacrylate | (49) | Acrylic acid | (1.0) | MM-29 (50) |
| GP-15 | (GP-15) | 2-Chloro-6-methylphenyl methacrylate | (60) | — | | MM-30 (40) |

(weight ratio)

EXAMPLE 1

A mixture of 2 g (solid basis, hereinafter the same) of Binder Resin (GP-3) according to the present invention, 38 g of Binder Resin (B-1) shown below, 200 g of photoconductive zinc oxide, 0.03 g of uranine, 0.06 g of Rose Bengal, 0.02 g of tetrabromophenol blue, 0.20 g of maleic anhydride and 300 g of toluene was dispersed in a ball mill for 3 hours to prepare a coating composition for a light-sensitive layer. The coating composition was coated on paper, which had been subjected to electrically conductive treatment, by a wire bar at a dry cov-

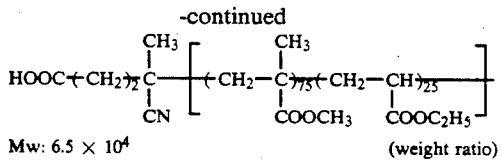

Mw: 6.5 × 10⁴ (weight ratio)

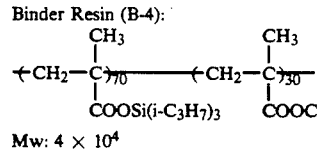

Binder Resin (B-4):

Mw: 4 × 10⁴ (weight ratio)

COMPARATIVE EXAMPLE A

An electrophotographic light sensitive material was prepared in the same manner as described in Example 1 except that 40 g of Binder Resin (B-1) described above was used as a binder resin in place of 2 g of Binder Resin (GP-3) and 38 g of Binder Resin (B-1).

COMPARATIVE EXAMPLE B

An electrophotographic light-sensitive material was prepared in the same manner as described in Example 1 except that 2 g of Binder Resin (B-4) shown below was used in place of 2 g of Binder Resin (GP-3).

With each of the light-sensitive materials thus prepared, film property (surface smoothness), electrostatic characteristics, image-forming performance, oil-desensitivity of a photoconductive layer (expressed in terms of contact angle of the photoconductive layer with water after oil-desensitizing treatment), and printing property were evaluated.

The results obtained are shown in Table 4 below.

TABLE 4

| | | Example 1 | Example 2 | Comparative Example A | Comparative Example B |
|---|---|---|---|---|---|
| Smoothness of Photo-[*1] conductive Layer (sec/cc): | | 400 | 410 | 405 | 400 |
| Electrostatic[*2] Characteristics: | | | | | |
| $V_{10}$ (−V): | Condition I | 570 | 580 | 570 | 575 |
| | Condition II | 560 | 565 | 555 | 560 |
| DRR (%): | Condition I | 88 | 95 | 89 | 93 |
| | Condition II | 84 | 92 | 85 | 90 |
| $E_{1/10}$: | Condition I | 14.0 | 8.0 | 14.3 | 9.6 |
| (lux · sec) | Condition II | 15.3 | 9.3 | 18.0 | 10.5 |
| $E_{1/100}$: | Condition I | 24.6 | 15.5 | 26 | 17 |
| (lux · sec) | Condition II | 28 | 18 | 30 | 20 |
| Image-Forming Performance[*3]: | Condition I | Good | Very Good | Good | Good |
| | Condition II | Good | Very Good | Good | Poor (reduced Dmax, cutting of fine lines) |
| Water-Retentivity of[*4] Light-Sensitive Material: | | Good | Good | Very Poor (severe background stains) | Very Poor (severe background stains) |
| Background stains on Print[*5]: | | No background stains on 5,000th print | No background stains on 6,000 print | Background stains from the start of printing | Background stains from the start of printing |

The evaluations described in Table 4 above were conducted as follows.

[*1] Smoothness of photoconductive Layer: The smoothness (sec/cc) of the light-sensitive material was measured using a Beck's smoothness test machine (manufactured by Kumagaya Riko K.K.) under an air volume condition of 1 cc.

[*2] Electrostatic Characteristics: The light-sensitive material was charged with a corona discharge to a voltage of −6 kV for 20 seconds in a dark room at 20° C. and 65% RH using a paper analyzed ("Paper Analyzer SP-428" manufactured by Kawaguchi Denki K.K.). Ten seconds after the corona discharge, the surface potential $V_{10}$ was measured. The sample was allowed to stand in a dark room for an additional 60 seconds, and the potential $V_{70}$ was measured.

The dark decay retention rate (DRR; %), i.e., percent retention of potential after dark decay for 60 seconds, was calculated from the following equation: DRR (%) = ($V_{70}/V_{10}$) × 100 Separately, the surface of the light-sensitive material was charged to −400 V with a corona discharge, then irradiated by visible light of the illuminance of 2.0 lux, and the time required for decay of the surface potential $V_{10}$ to one tenth was measured to obtain an exposure amount $E_{1/10}$ (lux · sec). Further, in the same manner as described for the measurement of $E_{1/10}$, the time required for decay of the surface potential $V_{10}$ to one-hundredth was measured to obtain an exposure amount $E_{1/100}$ (lux · sec). The measurements were conducted under conditions of 20° C. and 65% RH (Condition I) or 30° C. and 80% RH (Condition II).

[*3] Image-Forming Performance The light-sensitive material and a full-automatic plate making machine (ELP-404V manufactured by Fuji Photo Film Co., Ltd.) were allowed to stand for one day under normal conditions of 20° C. and 65% RH (Condition I), and the light-sensitive material was subjected to plate making by the full-automatic plate making machine using a developer (ELP-T manufactured by Fuji Photo Film Co., Ltd.) under the same conditions as above to prepare duplicated images. Fog and image quality of the duplicated images thus obtained were visually evaluated. In the same manner as above except for using high temperature and high humidity conditions of 30° C. and 80% RH (Condition II), the plate making was conducted and the duplicated images were evaluated.

[*4] Water Retentivity of Light-Sensitive Material The light-sensitive material without subjecting to plate making was passed once through an etching machine with an aqueous solution obtained by diluting twice an oil-desensitizing solution (ELP-EX manufactured by Fuji Photo Film Co., Ltd.) with distilled water, and then immersed in an aqueous solution having a pH of 11.0 adjusted using a buffer for 30 seconds. The material thus-treated was mounted on a printing machine (Hamada Star Type 800SX manufactured by Hamada Star K.K.) and printing was conducted. The extent of background stains occurred on the 50th print was visually evaluated.

[*5] Background Stains on Print The light-sensitive material was subjected to plate making in the same manner as described in [*3] above, passed once through an etching machine with ELP-EX, and then immersed in an aqueous solution having a pH of 11.0 same as used in [*4] above for 30 seconds. Using the offset master thus-obtained printing was conducted by a printing machine (Hamada Star Type 800SX), and a number of prints on which background stains were first visually observed was determined.

The evaluations described in Table 4 above were conducts as follows.

[*1] Smoothness of photoconductive Layer:

The smoothness (sec/cc) of the light-sensitive material was measured using a Beck's smoothness test machine (manufactured by Kumagaya Riko K.K.) under an air volume condition of 1 cc.

*2) Electrostatic Characteristics:

The light-sensitive material was charged with a corona discharge to a voltage of −6 kV for 20 seconds in a dark room at 20° C. and 65% RH using a paper analyzed ("Paper Analyzer SP-428" manufactured by Kawaguchi Denki K.K.). Ten seconds after the corona discharge, the surface potential $V_{10}$ was measured. The sample was allowed to stand in a dark room for an additional 60 seconds, and the potential $V_{70}$ was measured. The dark decay retention rate (DRR; %), i.e., percent retention of potential after dark decay for 60 seconds, was calculated from the following equation:

$DRR\ (\%) = (V_{70}/V_{10}) \times 100$

Separately, the surface of the light-sensitive material was charged to −400 V with a corona discharge, then irradiated by visible light of the illuminance of 2.0 lux, and the time required for decay of the surface potential $V_{10}$ to one tenth was measured to obtain an exposure amount $E_{1/10}$ (lux.sec).

Further, in the same manner as described for the measurement of $E_{1/10}$, the time required for decay of the surface potential $V_{10}$ to one-hundredth was measured to obtain an exposure amount $E_{1/100}$ (lux..sec).

The measurements were conducted under conditions of 20° C. and 65% RH (Condition I) or 30° C. and 80% RH (Condition II).

*3) Image-Forming Performance

The light-sensitive material and a full-automatic plate making machine (ELP-404V manufactured by Fuji Photo Film Co., Ltd.) were allowed to stand for one day under normal conditions of 20° C. and 65% RH (Condition I), and the light-sensitive material was subjected to plate making by the full-automatic plate making machine using a developer (ELP-T manufactured by Fuji Photo Film Co., Ltd.) under the same conditions as above to prepare duplicated images. Fog and image quality of the duplicated images thus obtained were visually evaluated. In the same manner as above except for using high temperature and high humidity conditions of 30° C. and 80% RH (Condition II), the plate making was conducted and the duplicated images were evaluated.

*4) Water Retentivity of Light-Sensitive Material

The light-sensitive material without subjecting to plate making was passed once through an etching machine with an aqueous solution obtained by diluting twice an oil-deseusitizing solution (ELP-EX manufactured by Fuji Photo Film Co., Ltd.) with distilled water, and then immersed in an aqueous solution having a pH of 11.0 adjusted using a buffer for 30 seconds. The material thus-treated was mounted on a printing machine (Hamada Star Type 800SX manufactured by Hamada Star K.K.) and printing was conducted. The extent of background stains occurred on the 50th print was visually evaluated.

*5) Background Stains on Print

The light-sensitive material was subjected to plate making in the same manner as described in *3) above, passed once through an etching machine with ELP-EX, and then immersed in an aqueous solution having a pH of 11.0 same as used in *4) above for 30 seconds. Using the offset master thus-obtained printing was conducted by a printing machine (Hamada Star Type 800SX), and a number of prints on which background stains were first visually observed was determined.

As can be seen from the results shown in Table 4 above, the electrostatic characteristics of the light-sensitive materials of the present invention and Comparative Example A were good, and the duplicated images obtained thereon were clear and had good image quality. The light-sensitive material of Example 2 exhibited the more preferred results on the electrostatic characteristics and image-forming performance. With the light-sensitive material of Comparative Example B, the degradation of these properties were observed under the severe environmental conditions of 30° C. and 80% RH.

When each of the light-sensitive materials was subjected to the oil-desensitizing treatment, and the degree of hydrophilic property of the non-image areas was evaluated, the severe background stains due to adherence of printing ink were observed on the samples of Comparative Examples A and B. These facts indicated that the hydrophilic property of the non-image areas was insufficient in these samples. Further, when each light-sensitive material was subjected to the plate making, oil-desensitizing treatment and printing, the printing plates formed from the light-sensitive materials according to the present invention provided 5,000 to 6,000 prints of clear images having good quality without the occurrence of background stains. On the contrary, the severe background stains in the non-image image areas were observed from the start of printing with the samples of Comparative Examples A and B.

From all these considerations, it is clear that only the electrophotographic lithographic printing plate precursor according to the present invention exhibits good image-forming performance even when the environmental conditions are fluctuated, forms the non-image areas having the sufficient hydrophilic property and does not cause background stains.

EXAMPLES 3 TO 12

By following the same procedure as Example 2 except that 2 g of each of Binder Resins (GP) shown in Table 5 below was used in place of 2 g of Binder Resin (GP-3), each of the electrophotographic light-sensitive materials shown in Table 5 was produced.

TABLE 5

| Example No. | Binder Resin (GP) |
|---|---|
| 3 | GP-2 |
| 4 | GP-12 |
| 5 | GP-4 |
| 6 | GP-5 |
| 7 | GP-6 |
| 8 | GP-7 |
| 9 | GP-8 |
| 10 | GP-9 |
| 11 | GP-10 |
| 12 | GP-15 |

With each of these light-sensitive material, the electrostatic characteristics, image-forming performance and printing property were evaluated in the same procedure as in Example 2.

Each light-sensitive material exhibited almost same results on the electrostatic characteristics and image forming performance as those in Example 2.

When each light-sensitive material was subjected to the oil-desensitizing treatment and evaluated, good water-retentivity of the light-sensitive material was observed. Further, as a result of plate making and printing, 6,000 prints of good quality were obtained.

EXAMPLE 13

A mixture of 3 g of Binder Resin (GP-5), 4.6 g of Binder Resin (B-5) shown below, 32.4 g of Binder Resin (B-6) shown below, 200 g of zinc oxide, 0.018 g of Cyanine Dye (A) shown below and 300 g of toluene was dispersed in a ball mill for 4 hours to prepare a coating composition for a light-sensitive layer. The coating composition as coated on paper, which had been subjected to electrically conductive treatment, by a wire bar at a dry coverage of 25 g/m$^2$, followed by drying at 100° C. for 3 minutes. The coated material was then allowed to stand in a dark place at 20° C. and 65% RH for 24 hours to prepare an electrophotographic light-sensitive material.

10 except for using 3 g of Binder Resin (B-4) described above in place of 3 g of Binder Resin (GP-5).

COMPARATIVE EXAMPLE D

An electrophotographic light-sensitive material was prepared in the same manner as described in Example 13 except for using 24 g of Binder Resin (B-4) described above, 4.6 g of Binder Resin (B-5) described above and 11.4 g of Binder Resin (B-6) described above in place of 3 g of Binder Resin (GP-5), 4.6 g of Binder Resin (B-5) and 32.4 g of Binder Resin (B-6).

With each of the light-sensitive materials thus prepared, film property (surface smoothness), electrostatic characteristics, image-forming performance, oil-desensitivity of a photoconductive layer (expressed in terms of contact angle of the photoconductive layer with water after oil-desensitizing treatment), and printing Binder Resin (B-5):

[Structure with phenyl-S-(CH$_2$-C(CH$_3$)(COOCH$_2$C$_6$H$_5$))- and COOH substituent]

Mw: 6.5 × 10$^3$

Binder Resin (B-6):

HOOC(CH$_2$)$_2$C(CH$_3$)(CN)-[(CH$_2$-C(CH$_3$)(COOC$_2$H$_5$))$_{75}$-(CH$_2$-C(CH$_3$)(COOCH$_2$CHCH$_2$OOCCH$_2$S))$_{25}$]-
with OH branch and -(CH$_2$-C(CH$_3$)(COOCH$_3$))- group Mw: 8 × 10$^4$ Cyanine Dye (A):

[Structure with two indole groups connected by -(CH=CH)$_3$-CH= chain, each with CH$_3$, CH$_3$ substituents; left N⊕-(CH$_2$)$_4$SO$_3$⊖, right N-(CH$_2$)$_4$SO$_3$K; methyl substituents on the benzene rings]

COMPARATIVE EXAMPLE C

An electrophotographic light-sensitive material was prepared in the same manner as described in Example property were evaluated.

The results obtained are shown in Table 6 below.

TABLE 6

|  |  | Example 13 | Comparative Example C | Comparative Example D |
|---|---|---|---|---|
| Smoothness of Photoconductive Layer (sec/cc): |  | 460 | 450 | 465 |
| Electrostatic*6 Characteristics: |  |  |  |  |
| V$_{10}$ (−V): | Condition I | 585 | 570 | 555 |
|  | Condition II | 570 | 550 | 530 |
| DRR (%): | Condition I | 85 | 85 | 82 |
|  | Condition II | 82 | 80 | 77 |
| E$_{1/10}$: | Condition I | 35 | 40 | 48 |
| (erg/cm$^2$) | Condition II | 40 | 43 | 52 |
| E$_{1/100}$: | Condition I | 65 | 69 | 77 |
| (erg/cm$^2$) | Condition II | 73 | 76 | 82 |
| Image-Forming | Condition I | Very Good | Good | No Good |
| Performance*7: | Condition II | Very Good | Good | Poor (background fog, cutting of letters and fine lines) |

TABLE 6-continued

|  | Example 13 | Comparative Example C | Comparative Example D |
|---|---|---|---|
| Water-Retentivity of Light-Sensitive Material: | Very Good (no background stains) | Poor (background stains) | Good |
| Background stains on Print: | No background stains on 6,000th print | Background stains from the start of printing | Background stains and cutting of letters and fine lines from the start of printing |

The electrostatic characteristics and image forming performance described in Table 6 were evaluated as follows. The other evaluations were conducted in the same manner as described in Example 1.

*6Electrostatic Characteristics: The light-sensitive material was charged with a corona discharge to a voltage of −6 kV for 20 seconds in a dark room at 20° C. and 65% RH using a paper analyzer ("Paper Analyzer SP-428" manufactured by Kawaguchi Denki K.K.). Ten seconds after the corona discharge, the surface potential $V_{10}$ was measured. The sample was allowed to stand in a dark room for an additional 120 seconds, and the potential $V_{130}$ was measured.

The dark decay retention rate (DRR; %), i.e., percent retention of potential after dark decay for 120 seconds, was calculated from the following equation: DRR (%) = $(V_{130}/V_{10}) \times 100$ Separately, the surface of the light-sensitive material was charged to −400 V with a corona discharge and then exposed to monochromatic light having a wavelength of 780 nm, and the time required for decay of the surface potential $V_{10}$ to the one-tenth was measured to obtain an exposure amount $E_{1/10}$ (erg/cm$^2$).

Further, in the same manner as described for the measurement of $E_{1/10}$, the time required for decay of the surface potential $V_{10}$ one-hundredth was measured to obtain an exposure amount $E_{1/100}$ (erg/cm$^2$).

The measurements were conducted under conditions of 20° C. and 65% RH (Condition I) or 30° C. and 80% RH (Condition II).

*7Image-Forming Performance: After the light-sensitive material was allowed to stand for one day under Condition I or II, each sample was charged to −5 kV and exposed to light emitted from a gallium-aluminum-arsenic semi-conductor laser (oscillation wavelength; 780 nm; output: 2.0 mW) at an exposure amount of 45 erg/cm$^2$ (on the surface of the photoconductive layer) at a pitch of 25 μm and a scanning speed of 300 m/sec. The thus formed electrostatic latent image was developed with a liquid developer (ELP-T manufactured by Fuji Photo Film Co., Ltd.), followed by fixing. The duplicated image obtained was visually evaluated for fog and image quality.

The electrostatic characteristics and image forming performance described in Table 6 were evaluated as follows. The other evaluations were conducted in the same manner as described in Example 1.

*6) Electrostatic Characteristics:

The light-sensitive material was charged with a corona discharge to a voltage of −6 kV for 20 seconds in a dark room at 20° C. and 65% RH using a paper analyzer ("Paper Analyzer SP-428" manufactured by Kawaguchi Denki K.K.). Ten seconds after the corona discharge, the surface potential $V_{10}$ was measured. The sample was allowed to stand in a dark room for an additional 120 seconds, and the potential $V_{130}$ was measured. The dark decay retention rate (DRR; %), i.e., percent retention of potential after dark decay for 120 seconds, was calculated from the following equation:

$$DRR\ (\%) = (V_{130}/V_{10}) \times 100$$

Separately, the surface of the light-sensitive material was charged to −400 V with a corona discharge and then exposed to monochromatic light having a wavelength of 780 nm, and the time required for decay of the surface potential $V_{10}$ to one-length was measured to obtain an exposure amount $E_{1/10}$ (erg/cm$^2$).

Further, in the same manner as described for the measurement of $E_{1/10}$, the time required for decay of the surface potential $V_{10}$ to one-hundredth was measured to obtain an exposure amount $E_{1/100}$ (erg/cm$^2$).

The measurements were conducted under conditions of 20° C. and 65% RH (Condition I) or 30° C. and 80% RH (Condition II).

*7) Image-Forming Performance:

After the light-sensitive material was allowed to stand for one day under Condition I or II, each sample was charged to −5 kV and exposed to light emitted from a gallium-aluminum-arsenic semi-conductor laser (oscillation wavelength: 780 nm; output: 2.0 mW) at an exposure amount of 45 erg/cm$^2$ (on the surface of the photoconductive layer) at a pitch of 25 μm and a scanning speed of 300 m/sec. The thus formed electrostatic latent image was developed with a liquid developer (ELP-T manufactured by Fuji Photo Film Co., Ltd.), followed by fixing. The duplicated image obtained was visually evaluated for fog and image quality.

As can be seen from the results shown in Table 6 above, the light-sensitive material of the present invention exhibited the excellent electrostatic characteristics and image forming performance. With the light-sensitive material of Comparative Example C, the electrostatic characteristic of $E_{1/100}$ somewhat decreased. However, the image-forming performance was on an almost practically applicable level depending on the original (for example, the original composed of letters or the original having highly white background). On the other hand, the light-sensitive material of Comparative Example D exhibited the decrease in the electrostatic characteristics, particularly under the severe conditions, and the background stains and cutting of letters and fine lines occurred in the duplicated images formed thereon.

Further, when the light-sensitive material of the present invention was subjected to the plate making, oil-desensitizing treatment and printing, 6,000 prints of good quality were obtained without adherence of printing ink owing to the sufficient hydrophilic property of the non-image areas.

On the contrary, the light-sensitive material of Comparative Example C had insufficient hydrophilic property. Although the light-sensitive material of Comparative Example D exhibited good water-retentivity, only unsatisfactory prints were obtained from the start of printing due to the poor duplicated images formed thereon by plate making.

EXAMPLE 14

A mixture of 4.0 g of Binder Resin (GP-9), 6.0 g of Binder Resin (B-7) shown below, 30 g of Binder Resin (B-8) shown below, 200 g of photoconductive zinc oxide, 0.018 go f Cyanine Dye (B) shown below, and 300 g of toluene was dispersed in a ball mill for 3 hours to prepare a coating composition for a light-sensitive layer. The coating composition was coated on paper, which had been subjected to electrically conductive treatment, by a wire bar at a dry coverage of 22 g/m², followed by drying at 100° C. for 3 minutes. The coated material was then allowed to stand in a dark place at 20° C. and 65% RH for 24 hours to prepare an electrophotographic light-sensitive material.

Binder Resin (B-7):

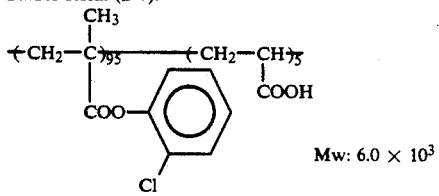

Mw: 6.0 × 10³

Binder Resin (B-8):

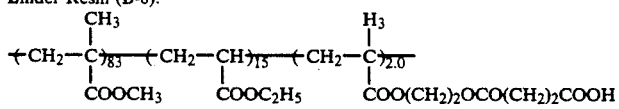

Mw: 5.6 × 10⁴

Cyanine Dye (B):

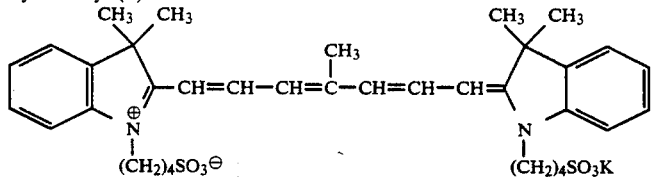

With the resulting light sensitive material of the present invention, the electrostatic characteristics and image-forming performance were evaluated under the conditions of 30° C. and 80% RH in the same procedure as in Example 13. The results obtained are shown below.

| | |
|---|---|
| $V_{10}$: | −630 V |
| DRR: | 82% |
| $E_{1/10}$: | 28 erg/cm² |
| $E_{1/100}$: | 52 erg/cm² |
| Image-Forming Performance: | Very Good |

Further, the light-sensitive material was subjected to plate making, allowed to stand for one minute under a high-pressure mercury lamp of 300 W at a distance of 10 cm for irradiation, and passed once through an etching machine with an aqueous solution obtained by diluting twice an oil-desensitizing solution (ELP-EX) with distilled water to prepare a printing plate. As a result of printing using the resulting printing plate in the same manner in Example 1, 6,000 prints of clear image having good quality without background stains were obtained.

EXAMPLES 15 TO 20

By following the same procedure as Example 13 except for using 3 g of each of Binder Resins (GP) shown in Table 7 below in place of 3 g of Binder Resin (GP-5), each of the electrophotographic light-sensitive materials shown in Table 7 was prepared.

TABLE 7

| Example No. | Binder Resin (GP) | Image-Forming Performance (30° C., 80% RH) | Water-Retentivity of Light-Sensitive Material |
|---|---|---|---|
| 15 | GP-1 | Very Good | Very Good |
| 16 | GP-3 | " | (no background stains) Very Good |
| 17 | GP-8 | " | (no background stains) Very Good |
| 18 | GP-11 | " | (no background stains) Very Good |
| 19 | GP-12 | " | (no background stains) Very Good |
| 20 | GP-14 | " | (no background stains) Very Good (no background stains) |

As can be seen from the results shown in Table 7 above, the light-sensitive materials according to the present invention exhibited the excellent image-forming performance even under the high temperature and high humidity conditions of 30° C. and 80% RH, as well as under the normal conditions of 20° C. and 65% RH. The water retentivity of each light-sensitive material were also good. When, each of the light-sensitive material was employed as an offset master plate, 6,000 prints of clear image having good quality without background stains were obtained.

EXAMPLE 21

A mixture of 6 g of Binder Resin (GP-16) shown below, 34 g of Binder Resin (B-9) shown below, 200 g of photoconductive zinc oxide, 0.03 g of uranine, 0.075 g of Rose Bengale, 0.045 g of bromophenol blue, 0.1 g of phthalic anhydride, and 240 g of toluene was dispersed in a ball mill for 4 hours to prepare a coating composition for a light-sensitive layer. The coating composition was coated on paper, which had been subjected to electrically conductive treatment, by a wire bar at a dry coverage of 20 g/m², and dried for 3 minutes at 100° C. Then, the coated material was allowed to stand in a dark place for 24 hours under the conditions of 20° C. and 65% RH to prepare an electrophotographic light-sensitive material.

Binder Resin (GP-16):

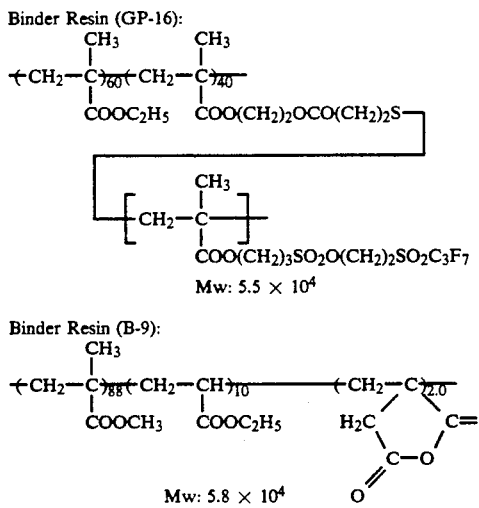

Mw: 5.5 × 10⁴

Binder Resin (B-9):

Mw: 5.8 × 10⁴

With the light-sensitive material thus-prepared, the electrostatic characteristics and image-forming performance were evaluated under the conditions of 30° C. and 80% RH in the same procedure as in Example 1. The results obtained are shown below.

| | |
|---|---|
| $V_{10}$: | $-545$ V |
| DRR: | 85% |
| $E_{1/10}$: | 13.6 lux · sec |
| $E_{1/100}$: | 30 lux · sec |

The duplicated images obtained were clear and free from the occurrence of background stains and cutting of fine lines even under the severe conditions of high temperature and high humidity, as well as under the normal conditions.

Further, the light-sensitive material was subjected to plate making, immersed in a 60% aqueous solution of methyl ethyl ketone containing 0.5 moles of monoethanolamine for one minute, and then passed once through an etching machine with an aqueous solution obtained by dissolving twice an oil-desensitizing solution (ELP-EX) with distilled water to conduct the oil-desensitizing treatment. As a result of printing using the resulting printing plate in the same manner as in Example 1, 6,000 prints of clear image having good quality without background stains were obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic lithographic printing plate precursor which utilizes an electrophotographic light-sensitive material comprising a conductive support having provided thereon at least one photoconductive layer containing photoconductive zinc oxide and a binder resin, wherein the binder resin contains at least one graft-type copolymer formed from, as a polymerizable component, at least one monofunctional macromonomer which has a weight average molecular weight of from $1 \times 10^3$ to $2 \times 10^4$, comprises at least one polymer component containing a functional group which has at least one atom selected from a fluorine atom and a silicon atom and is capable of forming at least one hydrophilic group selected from a sulfo group, a phosphono group, a carboxy group and a hydroxy group through decomposition, and has a polymerizable double bond group represented by the general formula (I) described below bonded to only one terminal of the main chain thereof

wherein $X_1$ represents —COO—, —OCO—, $+CH_2)_{\overline{n}}OCO—$, $+CH_2)_{\overline{m}}COO—$, —O—, —SO₂—, —CO—, —CONHCOO—, —CONHCONH—,

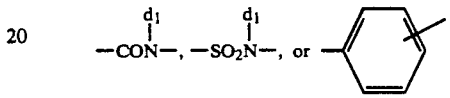

(wherein $d_1$ represents a hydrogen atom or a hydrocarbon group; and n and m each represents an integer of from 1 to 4); and $a_1$ and $a_{22}$, which may be the same or different, each represents a hydrogen atom, a halogen atom, a cyano group, a hydrocarbon group, —COO—$Z_1$ or —COO—$Z_1$ bonded via a hydrocarbon group (wherein $Z_1$ represents a hydrocarbon group which may be substituted), and at least one monomer copolymerizable with the monofunctional macromonomer, and the content of the monofunctional macromonomer is from 5 to 70% by weight in the graft type copolymer.

2. An electrophotographic lithographic printing plater precursor as claimed in claim 1, wherein the functional group capable of forming a hydrophilic group present in the monofunctional macromonomer is represented by the following general formula (III), (IV), (V) or (VI):

$$-V-O-L_1 \quad (III)$$

wherein V represents

and $L_1$ represents —CF₃,

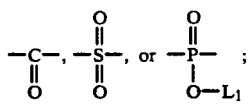

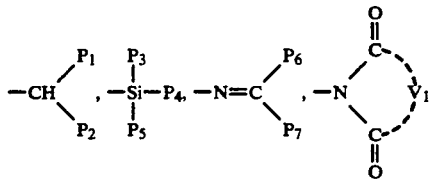

or $+CH_2)_{\overline{p}}SO_2P_8$ wherein $P_1$ represents a hydrogen atom, —CN, —CF₃, —COR₁₁ or —COOR₁₁ (wherein R₁₁ represents an alkyl group having from 1 to 7 carbon atoms which may be substituted, an aralkyl group having from 7 to 12 carbon atoms which may be substituted, an aromatic group, $+CH_2)_{\overline{n_1}}(CF_2)_{\overline{m_1}}CF_2H$ (wherein $n_1$ represents an integer of 1 or 2; and $m_1$ represents an integer of from 1 to 8), $(CH)_{n2}C_{m2}H_{2m2+1}$ (wherein $m_2$ represents an integer of from 0 to 2; and $m_2$ represents an integer of from 1 to 8), or

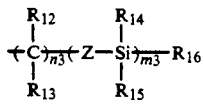

(wherein $n_3$ represents an integer of from 1 to 6; $m_3$ represents an integer of from 1 to 4; Z represents a mere bond or —O—; $R_{12}$ and $R_{13}$, which may be the same or different, each represents a hydrogen atom, an alkyl group having from 1 to 4 carbon atoms; and $R_{14}$, $R_{15}$ and $R_{16}$, which may be the same or different, each represents a hydrocarbon group having from 1 to 12 carbon atoms which may be substituted or —$OR_{17}$ wherein $R_{17}$ represents a hydrocarbon group having from 1 to 12 carbon atoms which may be substituted)); $P_2$ represents —$CF_3$, —$COR_{11}$ or —$COOR_{11}$ (wherein $R_{11}$ has the same meaning as defined above), provided that at least one of $P_1$ and $P_2$ is selected from the fluorine or silicon atom-containing substituents; $P_3$, $P_4$, and $P_5$, which may be the same or different, each has the same meaning as $R_{14}$, $R_{15}$ or $R_{16}$; $P_6$ and $P_7$, which may be the same or different, each has the same meaning as $R_{11}$, provided that at least one of $P_6$ and $P_7$ is selected from the fluorine or silicon atom-containing substituents; $P_8$ represents $\text{\textendash}(CH_2)_{\overline{n1}}(CF_2)_{\overline{m1}}CF_2H, \text{\textendash}(CH_2)_{\overline{n2}}C_{m2}(H_{2m2+1}$ or

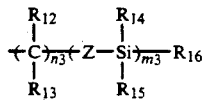

(wherein $n_1$, $m_1$, $n_2$, $m_2$, $n_3$, $m_3$, $R_{12}$, $R_{13}$, $R_{14}$, $R_{15}$ and $R_{16}$ each has the same meaning as defined above; and $V_1$ represents an organic moiety necessary to form a cyclic imido group having a substituent containing a fluorine atom and/or a silicon atom, $$-O-L_2 \quad (IV)$$

wherein $L_2$ represents

(wherein $P_3$, $P_4$ and $P_5$ each has the same meaning as defined above),

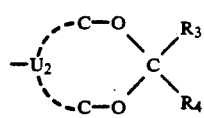

wherein $R_3$ and $R_4$, which may be the same or different, each represents a hydrogen atom, or has the same meaning as $R_{11}$ (provided that at least one of $R_3$ and $R_4$ is selected from the fluorine or silicon atom-containing substituents); and $U_2$ represents a carbon-carbon chain in which a hetero atom may be introduced (provided that the number of atoms present between the two oxygen atoms does not exceed 5),

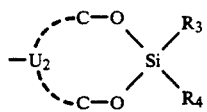

wherein $U_2$, $R_3$ and $R_4$ each has the same meaning as defined above.

3. An electrophotographic lithographic printing plate precursor as claimed in claim 1, wherein the polymerizable component containing the functional group in the monofunctional macromonomer is represented by the following general formula (VII):

$$\begin{array}{cc} c_1 & c_2 \\ | & | \\ -CH-C- \\ & | \\ & X'-Y'-W \end{array} \quad (VII)$$

wherein X' represents —O—, —CO—, —COO—, —OCO—,

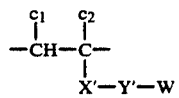

—$SO_2$—,

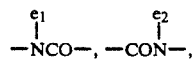

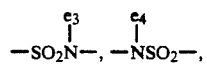

—$CH_2COO$—, —$CH_2OCO$—,

an aryl group, or a heterocyclic group (wherein $e_1$, $e_2$, $e_3$ and $e_4$ each represents a hydrogen atom, a hydrocarbon group, or —Y'—W; $f_1$ and $f_2$, which may be the same or different, each represents a hydrogen atom, a hydrocarbon group, or —Y'—W; and l is an integer of from 0 to 18); Y' represents carbon-carbon bond(s) for connecting the linkage group X' to the functional group W, between which one or more hetero atoms may be present; W represents the functional group; and $c_1$ and $c_2$, which may be the same of different, each represents a hydrogen atom, a halogen atom, a cyano group, a hydrocarbon group or —$COOZ_0$ (wherein $Z_0$ represents an alkyl group containing from 1 to 18 carbon atoms, an alkenyl group, an aralkyl group, an alicyclic group or an aryl group, each of which may be substituted with a group containing the functional group W), provided that the moiety of —X'—Y'— may not be present.

4. An electrophotographic lithographic printing plate precursor as claimed in claim 1, wherein the binder resin is further formed from, as a component copolymerizable with the monofunctional macromonomer, a monomer corresponding to a repeating unit represented by the general formula (IIa) or (IIb) described below:

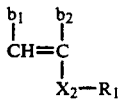
(IIa)

(IIb)

wherein $X_2$ has the same meaning as $X_1$ in the general formula (I); $R_1$ represents an aliphatic group having from 1 to 18 carbon atoms or an aromatic group having from 6 to 12 carbon atoms; $b_1$ and $b_2$, which may be the same or different, each has the same meaning as $a$ and $a_2$ in the general formula (I); and $R_2$ represents —CN, —CONH$_2$, or wherein Y represents a hydrogen atom, a halogen atom, a hydrocarbon group, an alkoxy group or —COOZ$_2$ (wherein $Z_2$ represents an alkyl group, an aralkyl group, or an aryl group).

5. An electrophotographic lithographic printing plate precursor as claimed in claim 4, wherein the amount of the monomer represented by the general formula (IIa) and/or (IIb) is from 30 to 95% by weight in the graft-type copolymer.

6. An electrophotographic lithographic printing plate precursor as claimed in claim 1, wherein the amount of the polymer component containing the functional group is not less than 40% by weight of the monofunctional macromonomer.

7. An electrophotographic lithographic printing plate precursor as claimed in claim 1, wherein the graft-type copolymer has a weight average molecular weight of from $1 \times 10^3$ to $1 \times 10^6$.

* * * * *